United States Patent
Ahn et al.

(10) Patent No.: US 11,884,552 B2
(45) Date of Patent: Jan. 30, 2024

(54) FLUORINATED CATION-DISORDERED ROCKSALT MATERIALS AND METHODS OF MAKING THEREOF

(71) Applicant: The Regents of The University of California, Oakland, CA (US)

(72) Inventors: Juhyeon Ahn, Berkeley, CA (US); Dongchang Chen, El Cerrito, CA (US); Guoying Chen, Oakland, CA (US)

(73) Assignee: The Regents of the University of California, Oakland, CA (US)

( * ) Notice: Subject to any disclaimer, the term of this patent is extended or adjusted under 35 U.S.C. 154(b) by 188 days.

(21) Appl. No.: 17/502,491

(22) Filed: Oct. 15, 2021

(65) Prior Publication Data

US 2022/0315436 A1 Oct. 6, 2022

Related U.S. Application Data

(60) Provisional application No. 63/104,738, filed on Oct. 23, 2020.

(51) Int. Cl.
 *H01M 4/04* (2006.01)
 *H01M 4/1315* (2010.01)
 (Continued)

(52) U.S. Cl.
 CPC ........... *C01D 15/04* (2013.01); *C01G 23/002* (2013.01); *C01G 33/006* (2013.01);
 (Continued)

(58) Field of Classification Search
 CPC ........ H01M 2004/028; H01M 4/0471; H01M 4/1315; H01M 4/13915; H01M 4/485; H01M 4/505; H01M 4/525; H01M 4/583
 See application file for complete search history.

(56) References Cited

U.S. PATENT DOCUMENTS

2018/0205073 A1* 7/2018 Natsui ............... H01M 10/0562
2019/0088945 A1* 3/2019 Ceder ................ C01G 45/1228
(Continued)

FOREIGN PATENT DOCUMENTS

WO   WO 2020-137042   *  7/2020

OTHER PUBLICATIONS

Lee et al., "Mitigating oxygen loss to improve the cycling performance of high capacity cation-disordered cathode materials," Nature Communications, vol. 8, No. 981, pp. 1-10, (Oct. 17, 2017).
(Continued)

*Primary Examiner* — Brittany L Raymond

(57) ABSTRACT

This disclosure provides systems, methods, and apparatus related to lithium metal oxyfluorides. In one aspect, a method for manufacturing a lithium metal oxyfluoride having a general formula $Li_{1+x}(MM')_zO_{2-y}F_y$, with $0.6 \leq z \leq 0.95$, $0 < y \leq 0.67$, and $0.05 \leq x \leq 0.4$, the lithium metal oxyfluoride having a cation-disordered rocksalt structure, includes: providing at least one lithium-based precursor; providing at least one redox-active transition metal-based precursor; providing at least one redox-inactive transition metal-based precursor; providing at least one fluorine-based precursor comprising a fluoropolymer; and mixing the at least one lithium-based precursor, the at least one redox-active transition metal-based precursor, the at least redox-inactive transition metal-based precursor, and the at least one fluorine-based precursor comprising a fluoropolymer to form a mixture.

13 Claims, 17 Drawing Sheets

(51) Int. Cl.

| | |
|---|---|
| H01M 4/13915 | (2010.01) |
| H01M 4/485 | (2010.01) |
| H01M 4/505 | (2010.01) |
| H01M 4/525 | (2010.01) |
| H01M 4/583 | (2010.01) |
| C01D 15/04 | (2006.01) |
| C01G 33/00 | (2006.01) |
| C01G 45/00 | (2006.01) |
| C01G 23/00 | (2006.01) |
| H01M 10/0525 | (2010.01) |
| H01M 4/02 | (2006.01) |

(52) U.S. Cl.
CPC ........ *C01G 45/006* (2013.01); *H01M 4/0471* (2013.01); *H01M 4/1315* (2013.01); *H01M 4/13915* (2013.01); *H01M 4/485* (2013.01); *H01M 4/505* (2013.01); *H01M 4/525* (2013.01); *H01M 4/583* (2013.01); *H01M 10/0525* (2013.01); *C01P 2002/77* (2013.01); *C01P 2006/40* (2013.01); *H01M 2004/028* (2013.01)

(56) References Cited

U.S. PATENT DOCUMENTS

| | | |
|---|---|---|
| 2020/0194790 A1 | 6/2020 | Ceder |
| 2021/0280905 A1* | 9/2021 | Sakaida ............... H01B 1/06 |

OTHER PUBLICATIONS

Freire et. al., "A new active Li—Mn—O compound for high energy density Li-ion batteries," Nature Materials, vol. 15, pp. 1730177, (Nov. 23, 2015).

Sato et. al., "Metastable and nanosize cation-disordered rocksalt-type oxides: revisit of stoichiometric LiMnO2 and NaMnO2," Journal of Materials Chemistry A, vol. 6, pp. 13943-13951, (Jun. 2018).

Ji et. al., "Hidden structural and chemical order controls lithium transport in cation-disordered oxides for rechargeable batteries," Nature Communications, vol. 10, pp. 1-9, (Feb. 2019).

Zhao et. al., "Stabilizing the oxygen lattice and reversible oxygen redox chemistry through structural dimensionality in lithium-rich cathode oxides," Angewandte Chemi, vol. 131, No. 13, pp. 4367-4371, (Feb. 2019).

Yao et. al., "Interplay of cation and anion redox in Li4Mn2O5 cathode material and prediction of improved Li4(Mn,M) 2O5 electrode for Li-ion batteries," Science Advances, vol. 5, No. 5, pp. 1 through 9 (May 2018).

Freire et. al., "Investigation of the exceptional charge performance of the 0.93Li4—xMn2O5—0.07Li2O composite cathode for Li-ion Batteries." Journal of Materials and Chemistry A, vol. 6, pp. 5156-5165, (Feb. 2018).

Li et. al., "Effect of Nb and F Co-doping on Li1.2Mn0.54Ni0.13Co0.13O2 cathode material for high-performance lithium-ion batteries." Frontiers in Chemistry, vol. 6, pp. 1 through 12, (Apr. 2018).

Ahn et al., "A Fluorination Method for Improving Cation-Disordered Rocksalt Cathode Performance," Advanced Energy Materials, vol. 10, pp. 2001671 (1 thru 9), (2020).

Lee et al., "Mitigating oxygen loss to improve the cycling performance of high capacity cation-disordered cathode materials," vol. 8, No. 981, pp. 1-10, (Oct. 17, 2017).

Ouyang et al., "Effect of Fluorination on Lithium Transport and Short-Range Order in Disordered-Rocksalt-Type Lithium-IonBattery Cathodes," Advanced Energy Materials, vol. 10, pp. 1903240 (1 thru 11), (Feb. 3, 2020).

Zhao et al., "Structural and mechanistic revelations on high capacity cation-disordered Li-rich oxides for rechargeable Li-ion batteries," Energy Storage Materials, vol. 16, pp. 354-363, (Jan. 2019).

Ji et al., "Computational Investigation and Experimental Realization of Disordered High-Capacity Li-Ion Cathodes Based on Ni Redox," Chemistry of Materials, vol. 31, pp. 2431-2442, (Mar. 26, 2019).

Lee et al., "Reversible Mn2+/Mn4+ double redox in lithium-excess cathode materials," Nature, vol. 556, pp. 185-190, (Apr. 11, 2018).

Lun et al., "Design Principles for High-Capacity Mn-Based Cation-Disordered Rocksalt Cathodes," Chem, vol. 6, No. 1, pp. 153-168, (Jan. 9, 2020).

Kitchaev et al., "Design principles for high transition metal capacity in disordered rocksalt Li-ion cathodes†," Energy and Environmental Science, vol. 11, pp. 2159-2171, (May 24, 2018).

Lun et al., "Improved Cycling Performance of Li-Excess Cation-Disordered Cathode Materials upon Fluorine Substitution," Advanced Energy Materials, vol. 9, pp. 1802959 (1 thru 11), (Nov. 16, 2018).

House et al., "Lithium manganese oxyfluoride as a new cathode material exhibiting oxygen redox†," Energy and Environmental Science, vol. 11, pp. 926-932, (Feb. 20, 2018).

Chen et al., "Disordered Lithium-Rich Oxyfluoride as a Stable Host for Enhanced Li+ Intercalation Storage," Advanced Energy Materials, vol. 5, pp. 1401814 (1 thru 7), (Feb. 3, 2015).

Chen et al., "Li+ intercalation in isostructural Li2VO3 and Li2VO2F with O2- and mixed O2-/F-anions†," Physical Chemistry Chemical Physics, vol. 17, pp. 17288-17295, (Jun. 8, 2015).

Chen et al., "High-Performance Low-Temperature Li+ Intercalation in Disordered Rock-Salt Li—Cr—V Oxyfluorides," Chem Electro Chem Communications, vol. 3, pp. 892-895, (Apr. 1, 2016).

Takeda et al., "Reversible Li storage for nanosize cation/anion-disordered rocksalt-type oxyfluorides: LiMoO2—xLiF ($0 \leq x \leq 2$) binary system," Journal of Power Sources, vol. 367, pp. 122-129, (Nov. 1, 2017).

Takeda et al., "Improved Electrode Performance of Lithium-Excess Molybdenum Oxyfluoride: Titanium Substitution with Concentrated Electrolyte," ACS Applied Energy Materials, vol. 2, pp. 1629-1633, (Feb. 2, 2015).

Richards et al., "Fluorination of Lithium-Excess Transition Metal Oxide Cathode Materials," Advanced Energy Materials, vol. 8, pp. 1701533 (1 thru 7), (Oct. 4, 2017).

Jones et al., "Short-range ordering in a battery electrode, the 'cation-disordered' rocksalt Li1.25Nb0.25Mn0.5O2†," Chemical Communications, vol. 55, pp. 9027-9030, (Jul. 4, 2019).

Kan et al., "Unravelling Solid-State Redox Chemistry in Li1.3Nb0.3Mn0.4O2 Single-Crystal Cathode Material," Chemistry of Materials, vol. 30, No. 5, pp. 1655-1666, (Feb. 9, 2018).

Hirai et al., "Facile synthetic route to transition metal oxyfluorides via reactions between metal oxides and PTFE," Journal of Fluorine Chemistry, vol. 209, pp. 43-48, (May 2018).

Wang et al., "The Design of a LiFePO4/Carbon Nanocomposite With a Core-Shell Structure and Its Synthesis by an In Situ Polymerization Restriction Method†," Angewandte Chemie, vol. 47, pp. 7461-7465, (Sep. 8, 2008).

Ravet et al., "Mechanism of the Fe3+ Reduction at Low Temperature for LiFePO4 Synthesis from a Polymeric Additive," Chemistry of Materials, vol. 19, No. 10, pp. 2595-2602, (Apr. 24, 2007).

Wang et al., "Understanding and recent development of carbon coating on LiFePO4 cathode materials for lithium-ion batteries," Energy & Environmental Science, vol. 5, pp. 5163-5185, (Nov. 11, 2011).

* cited by examiner

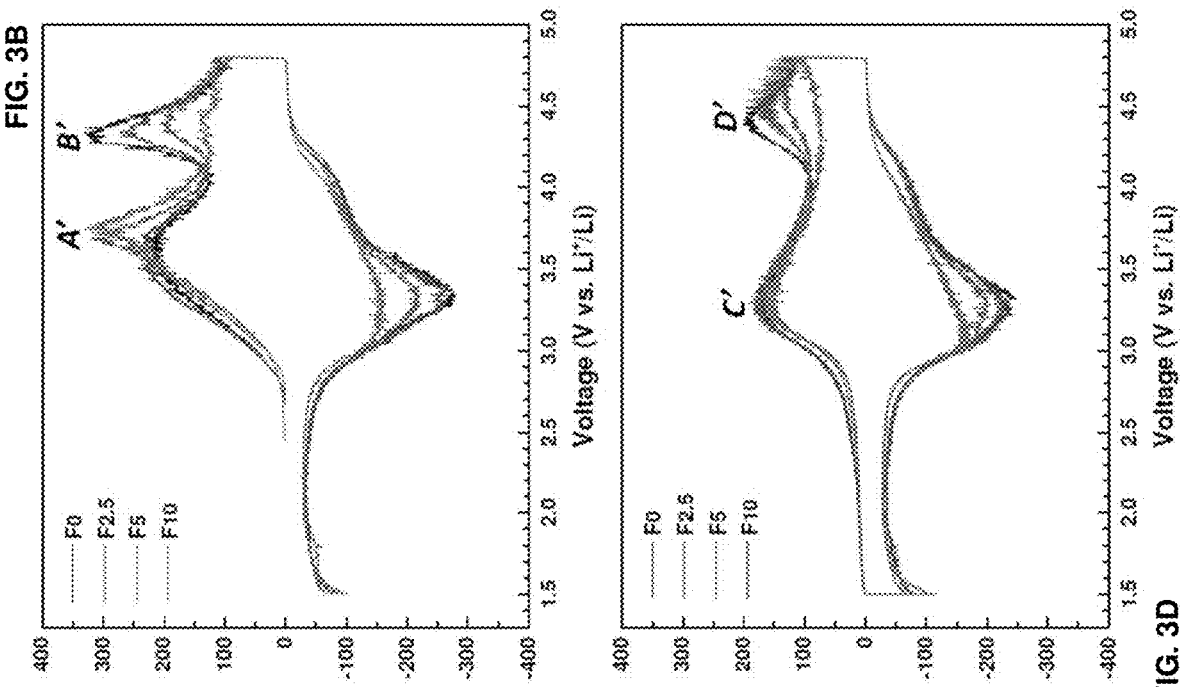
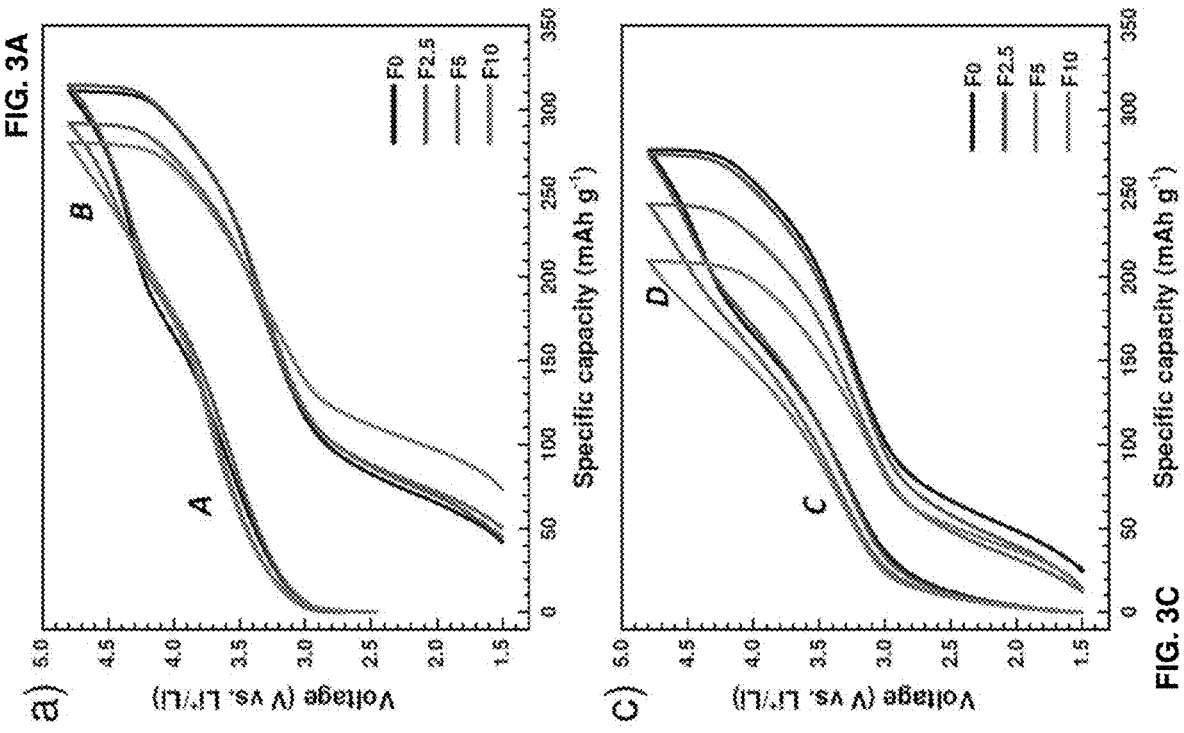

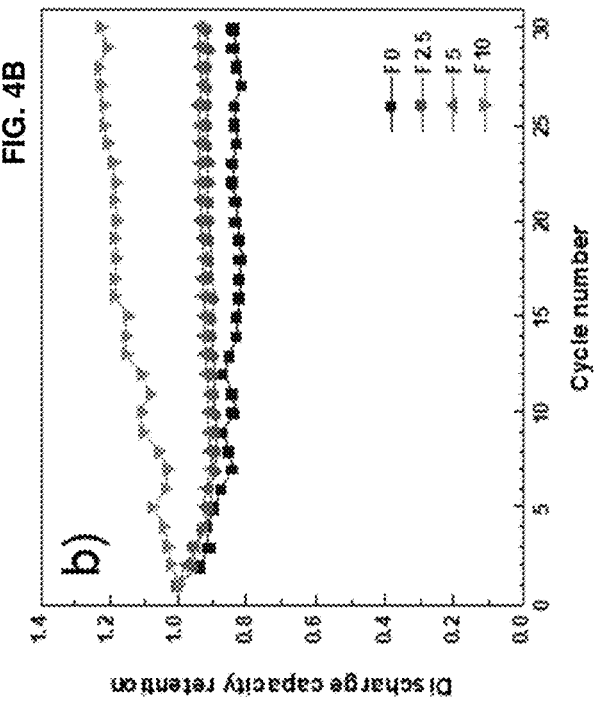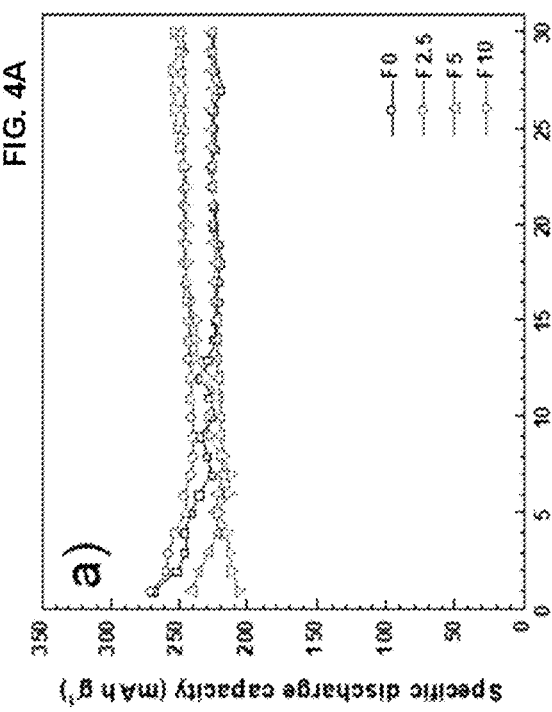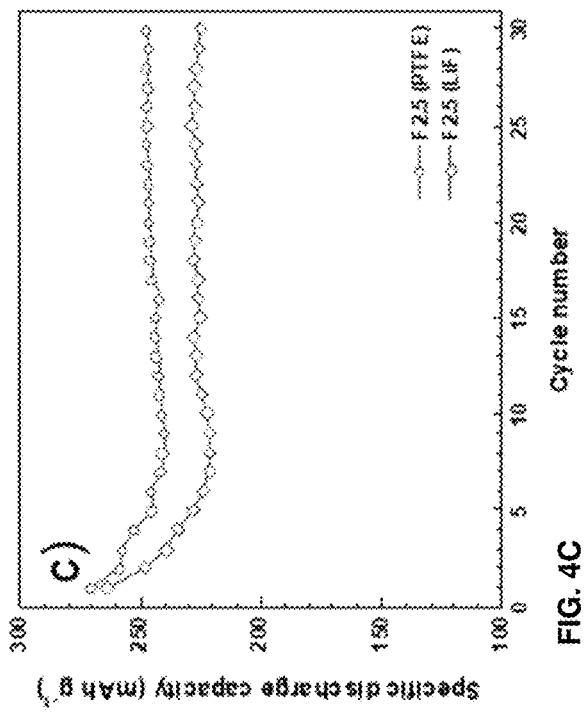
FIG. 4A, FIG. 4B, FIG. 4C, FIG. 4D

FLUORINATED CATION-DISORDERED ROCKSALT MATERIALS AND METHODS OF MAKING THEREOF

RELATED APPLICATIONS

This application claims priority to U.S. Provisional Patent Application No. 63/104,738, filed 23 Oct. 2020, which is herein incorporated by reference.

STATEMENT OF GOVERNMENT SUPPORT

This invention was made with government support under Contract No. DE-AC02-05CH11231 awarded by the U.S. Department of Energy. The government has certain rights in this invention.

TECHNICAL FIELD

This disclosure relates generally to lithium-ion batteries and more particularly to lithium-ion battery cathode materials.

BACKGROUND

With the growing demand for large-scale energy storage such as electric vehicles (EVs) and other energy storage systems (ESS), lithium-ion batteries (LIB s) are expected to meet the requirements on high energy and power densities, low cost, and long life, all of which are predominately determined by the intrinsic characteristics of the electrode materials. In recent years, lithium-rich cation-disordered rocksalt oxide (DRX) cathodes have received attention because of their high energy density (>1,000 Wh/kg) and high operating voltages, making them attractive alternatives to the conventional layered cathode materials such as lithium nickel manganese cobalt oxides ($LiNi_xMn_y Co_{1-x-y}O_2$, NMCs). The large charge storage capacity in the DRX materials is attributed to the collective redox activities from a single- or multi-electron pairs of TM cations, such as $Ni^{2+}/Ni^{3+}$, $Ni^{2+}/Ni^{4+}$, $Mn^{2+}/Mn^{4+}$, $Mn^{3+}/Mn^{4+}$, $V^{3+}/V^{4+}$, $V^{4+}/V^{5+}$, $Cr^{3+}/Cr^{6+}$, $Mo^{3+}/Mo^{5+}$, and $Mo^{3+}/Mo^{6+}$, and oxygen anions ($O^{2-}/O^{n-}$, $0 \leq n < 2$). On the other hand, the $d^0$ TM elements (e.g., 4d $Ti^{4+}$ and $Cr^{6+}$ as well as 5d $Nb^{5+}$ and $Mo^{6+}$) are essential for structural stability but they remain electrochemically inactive.

The reversibility of the oxygen anionic redox activity is believed to be much poorer compared to that of the cation redox when operates at high upper voltage, impeding the overall long-term cycling stability of these newer cathode materials. In developing mitigation approaches to the drawback of irreversible oxygen redox behavior, computational modeling and experimental studies on partial substitution of oxygen by fluorine has been attempted. In general, the F-DRX cathodes were found to have better performance compared to their oxide counterparts, with less oxygen release, less impedance rise, and better cycling stability.

The substitution of oxygen by fluorine is traditionally achieved by introducing LiF precursor during F-DRX synthesis. As F and Li share stronger bonding than that between F and TM, the lack in thermodynamic driving force limits the overall solubility of LiF in DRX. Several factors such as chemical composition (Li content, oxidation state of the redox-active TM, and $d^0$ TM), precursor choices, synthesis method (solid-state, solvothermal, and ball-milling etc.), synthesis temperature, and duration, were found to influence F solubility.

For example, higher levels of F substitution were recently achieved on DRX compounds such as $Li(1.333)-Mn^{3+}-Mn^{4+}-O-F$, $Li_2(Mn^{2+})_2Nb_{1/3}O_2F$ and $Li_2(Mn_2+)_{1/2}Ti_{1/2}O_2F$. These samples were synthesized through a prolonged high-energy ball-milling route rather than the typical solid-state process, making them difficult for commercial scale-up. For a given composition space, such as the $Li(1.2)-Mn^{3+}-Nb^{5+}-O-F$ (LMNOF), system using the solid-state synthesis method, it was found that significant LiF phase segregation occurs upon increasing the F content to beyond ~7.5 at. %. This largely limits the ability in utilizing F substitution to improve the performance of DRX cathode materials.

SUMMARY

In Li-rich cation-disordered rocksalt oxide cathodes (DRX), partial fluorine (F) substitution in the oxygen anion sublattice can increase the capacity contribution from transition-metal (TM) redox while reducing that from the less reversible O redox. To date, limited fluorination substitution is achieved by introducing LiF precursor during the solid-state synthesis. To take full advantage of the fluorination effect, however, a higher F content may be desired.

One innovative aspect of the subject matter described in this disclosure can be implemented in a method of manufacturing a lithium metal oxyfluoride having a general formula $Li_{1+x}(MM')_{1-x}O_{2-y}F_y$, with $0 < y \leq 0.67$ and $0.09 \leq x \leq 0.35$ or having a general formula $Li_{1+x}(MM')_z O_{2-y}F_y$, with $0.6 \leq z \leq 0.95$, $0 < y \leq 0.67$, and $0.05 \leq x \leq 0.4$. The lithium metal oxyfluoride has a cation-disordered rocksalt structure. The method includes: providing at least one lithium-based precursor; providing at least one redox-active transition metal-based precursor; providing at least one redox-inactive transition metal-based precursor; providing at least one fluorine-based precursor comprising a fluoropolymer; and mixing the at least one lithium-based precursor, the at least one redox-active transition metal-based precursor, the at least redox-inactive transition metal-based precursor, and the at least one fluorine-based precursor comprising a fluoropolymer to form a mixture.

Another innovative aspect of the subject matter described in this disclosure is a lithium metal oxyfluoride having a general formula $Li_{1+x}(MM')_{1-x}O_{2-y}F_y$, with $0 < y \leq 0.67$ and $0.09 \leq x \leq 0.35$ or having a general formula $Li_{1+x}(MM')_z O_{2-y}F_y$, with $0.6 \leq z \leq 0.95$, $0 < y \leq 0.67$, and $0.05 \leq x \leq 0.4$. The lithium metal oxyfluoride has a cation-disordered rocksalt structure. In some implementations, $0.2 < y \leq 0.67$. In some implementations, $0.25 < y \leq 0.67$. In some implementations, $0.3 < y \leq 0.67$. In some implementations, $0.35 < y \leq 0.67$. In some implementations, $0.4 < y \leq 0.67$. In some implementations, $0.2 < y \leq 0.4$.

In some implementations, M is selected from a group consisting of Ni, Mn, Fe, Co, V, Cr, W, Mo, and combinations thereof, and M' is selected from a group consisting of Ti, Zr, Nb, Ta, W, Mo, and combinations thereof. In some implementations, the lithium metal oxyfluoride is $Li_{1.2}Mn_{0.7}Nb_{0.1}O_{1.8}F_{0.2}$. In some implementations, the lithium metal oxyfluoride is $Li_{1.3}Mn_{0.7}Ti_{0.1}O_{1.8}F_{0.2}$ or $Li_{1.1}Mn_{0.8}Ti_{0.1}O_{1.9}F_{0.1}$.

Another innovative aspect of the subject matter described in this disclosure can be implemented in a positive electrode material including a lithium metal oxyfluoride having a general formula $Li_{1+x}(MM')_{1-x}O_{2-y}F_y$, with $0 < y \leq 0.67$ and $0.09 \leq x \leq 0.35$ or having a general formula $Li_{1+x}(MM')_z O_{2-y}F_y$, with $0.6 \leq z \leq 0.95$, $0 < y \leq 0.67$, and $0.05 \leq x \leq 0.4$. The lithium metal oxyfluoride has a cation-disordered rocksalt structure. In some implementations, $0.2<y\leq0.67$. In some implementations, $0.25<y\leq0.67$. In some implementations, $0.3<y\leq0.67$. In some implementations, $0.35<y\leq0.67$. In some implementations, $0.4<y\leq0.67$. In some implementations, $0.2<y\leq0.4$. In some implementations, M is selected from a group consisting of Ni, Mn, Fe, Co, V, Cr, W, Mo, and combinations thereof, and M' is selected from a group consisting of Ti, Zr, Nb, Ta, W, Mo, and combinations thereof. In some implementations, the lithium metal oxyfluoride is $Li_{1.2}Mn_{0.7}Nb_{0.1}O_{1.8}F_{0.2}$. In some implementations, the lithium metal oxyfluoride is $Li_{1.3}Mn_{0.7}Ti_{0.1}O_{1.8}F_{0.2}$ or $Li_{1.1}Mn_{0.8}Ti_{0.1}O_{1.9}F_{0.1}$.

Another innovative aspect of the subject matter described in this disclosure can be implemented in a lithium-ion battery including a negative electrode material, an electrolyte, and a positive electrode material. The positive electrode material includes a lithium metal oxyfluoride having a general formula $Li_{1+x}(MM')_{1-x}O_{2-y}F_y$, with $0<y\leq0.67$ and $0.09\leq x\leq0.35$ or having a general formula $Li_{1+x}(MM')_z O_{2-y}F_y$, with $0.6\leq z\leq0.95$, $0<y\leq0.67$, and $0.05\leq x\leq0.4$. The lithium metal oxyfluoride has a cation-disordered rocksalt structure. In some implementations, $0.2<y\leq0.67$. In some implementations, $0.25<y\leq0.67$. In some implementations, $0.3<y\leq0.67$. In some implementations, $0.35<y\leq0.67$. In some implementations, $0.4<y\leq0.67$. In some implementations, $0.2<y\leq0.4$. In some implementations, M is selected from a group consisting of Ni, Mn, Fe, Co, V, Cr, W, Mo, and combinations thereof, and M' is selected from a group consisting of Ti, Zr, Nb, Ta, W, Mo, and combinations thereof. In some implementations, the lithium metal oxyfluoride is $Li_{1.2}Mn_{0.7}Nb_{0.1}O_{1.8}F_{0.2}$. In some implementations, the lithium metal oxyfluoride is $Li_{1.3}Mn_{0.7}Ti_{0.1}O_{1.8}F_{0.2}$, or $Li_{1.1}Mn_{0.8}Ti_{0.1}O_{1.9}F_{0.1}$.

As described herein, a fluorinated polymeric precursor can be used to increase the F solubility in DRX and the incorporation of F content up to 10-12.5 at. % into the rocksalt lattice of a model Li—Mn—Nb—O (LMNO) system, largely exceeding the 7.5 at. % limit achieved with LiF synthesis. Higher F content in the fluorinated-DRX (F-DRX) significantly improves electrochemical performance, with a reversible discharge capacity of ~255 mAh/g achieved at 10 at. % of F substitution. After 30 cycles, up to 40% increase in capacity retention was achieved through the fluorination. This demonstrates the feasibility of using a new and effective fluorination process to synthesize advanced DRX cathode materials.

Details of one or more embodiments of the subject matter described in this specification are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

(FIG. 2A) Mn K-edge XANES spectra and normalized soft XAS spectra of: (FIG. 2B) Mn $L_2$- and $L_3$-edges, (FIG. 2C) Nb $M_4$- and $M_5$-edges, (FIG. 2D) O K-edge, (FIG. 2E) F K-edge and (FIG. 2F) F K-edge including all synthesized DRX materials. TEY spectra are shown in thick lines while FY spectra are shown in thin lines.

FIGS. 3A-3E show electrochemical performance collected on F0, F2.5, F5 and F10 half-cells: voltage profiles (FIGS. 3A and 3C) and the corresponding differential capacity vs. voltage plots (FIGS. 3B and 3D) during the first cycle (FIGS. 3A and 3B) and the second cycle (FIGS. 3C and 3D). FIG. 3E shows the capacity origin as a function of F content in the first cycle (triangle and bar), second cycle (square and bar), and the third cycle (cross and bar).

FIGS. 4A and 4B show a comparison of specific discharge capacity and capacity retention of F0, F2.5, F5 and F10 cathodes during the first 30 cycles. FIGS. 4C and 4D show a comparison of specific discharge capacity and capacity retention of F2.5 prepared with PTFE and LiF precursors in the first 30 cycles.

(FIG. 5A) F0, (FIG. 5B) F2.5, (FIG. 5C) F5, and (FIG. 5D) F10.

DETAILED DESCRIPTION

Figure 1:
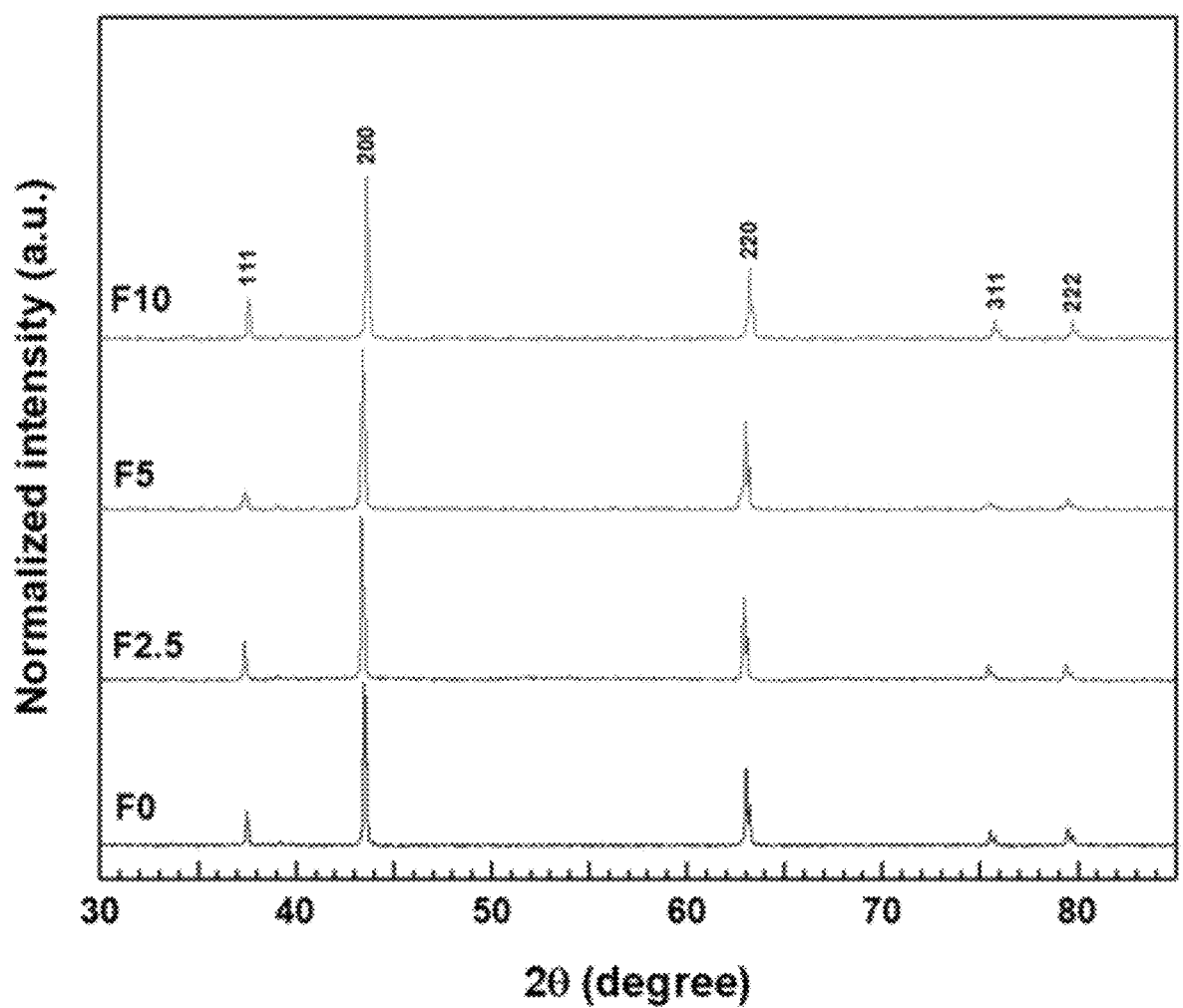
FIG. 1 shows X-ray diffraction patterns of the non-fluorinated (F0) and the fluorinated (F2.5, F5, and F10) as-prepared DRX powder samples.

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

In the following description, numerous specific details are set forth in order to provide a thorough understanding of the present invention. Particular example embodiments of the present invention may be implemented without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise.

The terms "about" or "approximate" and the like are synonymous and are used to indicate that the value modified by the term has an understood range associated with it, where the range can be ±20%, ±15%, ±10%, ±5%, or ±1%. The terms "substantially" and the like are used to indicate that a value is close to a targeted value, where close can mean, for example, the value is within 80% of the targeted value, within 85% of the targeted value, within 90% of the targeted value, within 95% of the targeted value, or within 99% of the targeted value.

Described herein are methods to synthesize high-energy lithium-rich rocksalt oxyfluoride cathode materials for lithium-ion batteries (LIBs). Because of their high energy density (>1000 Wh/kg), lithium-rich cation-disordered rocksalts with a general formula of $Li_{1+x}(MM')_{1-x}O_2$ are promising alternatives to the conventional layered cathode materials such as lithium nickel manganese cobalt oxides ($LiNi_xMn_yCo_{1-x-y}O_2$, NMC). By increasing the capacity contribution from the transition-metal (M) redox and reducing that from the less reversible oxygen (O) redox, partial fluorine (F) substitution into the oxygen anion sublattice of the rocksalts can improve electrochemical performance. A high F content can maximize the effect.

The methods described herein use a fluorinated polymeric precursor to increase the F solubility in lithium-rich cation-disordered rocksalts beyond the limit set by lithium fluoride (LiF). The use of fluoropolymers also reduces manufacturing cost, as fluoropolymers are significantly less expensive than LiF; typical fluoropolymers are at least 20 times less expensive than LiF. Plastic fluoropolymers, such as polytetrafluoroethylene (PTFE) and its variants, fluorinated ethylene propylene (FEP), perfluoroalkoxy (PFA), as well as amorphous fluoropolymer such as polyvinyl fluoride (PVF), polyvinylidene fluoride (PVDF), and ethylene-tetrafluoroethylene copolymer (ETFE), for example, can be used in the methods.

The high F content in the lithium-rich cation-disordered rocksalts also enables an increase in redox-active M content, resulting in oxyfluoride compounds with excellent rate capability and cycling stability. A Li— and Mn-rich rocksalt cathode material capable of stable cycling at a discharge capacity of ~255 mAh/g, which represents one of the best performances obtained on this class of materials thus far, is also described herein.

Figure 6:
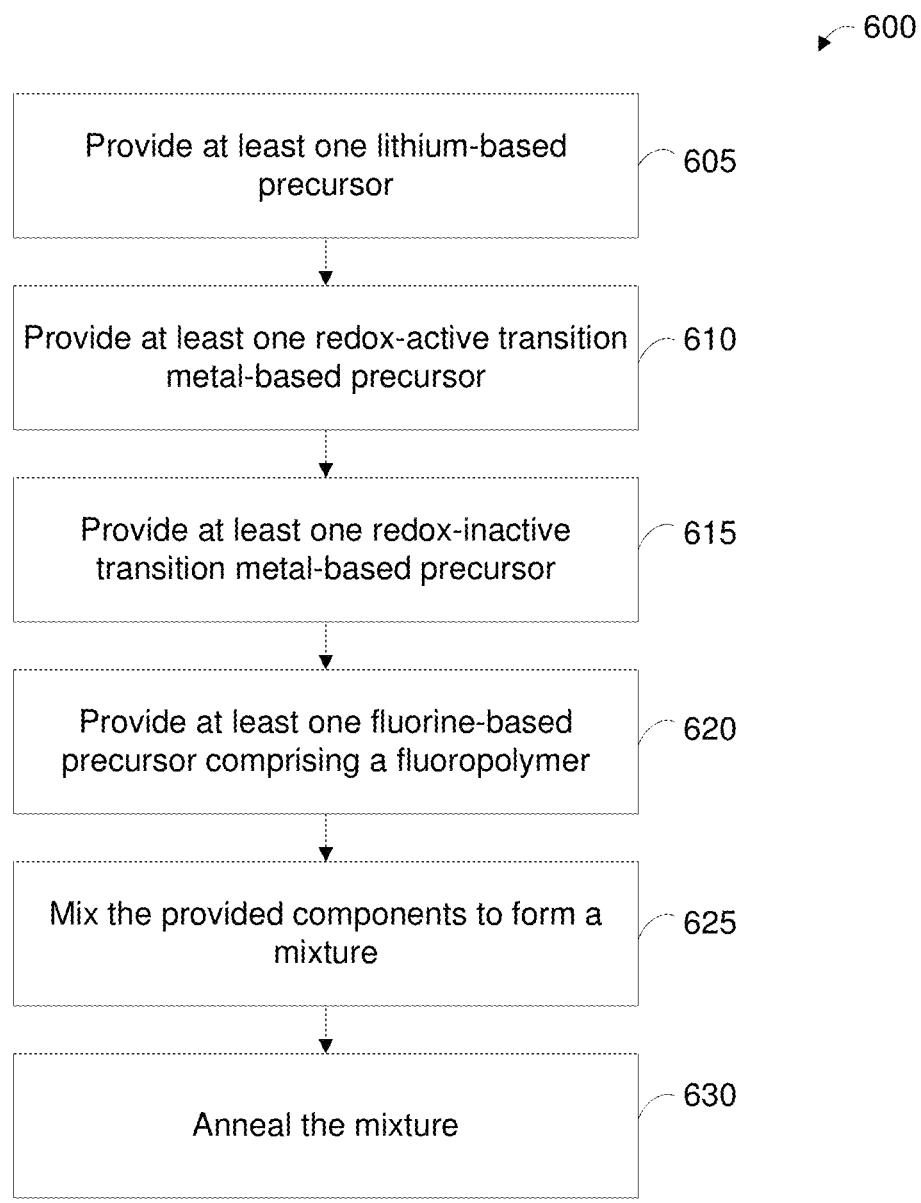
FIG. 6 shows an example of a flow diagram illustrating a process for manufacturing a lithium metal oxyfluoride.

FIG. 6 shows an example of a flow diagram illustrating a process for manufacturing a lithium metal oxyfluoride. In some embodiments, the lithium metal oxyfluoride has a general formula $Li_{1+x}(MM')_{1-x}O_{2-y}F_y$, with $0<y\leq0.67$, and $0.09\leq x\leq0.35$. In some embodiments, the lithium metal oxyfluoride has a general formula $Li_{1+x}(MM')_zO_{2-y}F_y$, with $0.6\leq z\leq0.95$, $0<y\leq0.67$, and $0.05\leq x\leq0.4$. The lithium metal oxyfluoride has a cation-disordered rocksalt structure.

In some embodiments, M is selected from a group consisting of Ni, Mn, Fe, Co, V, Cr, W, Mo, and combinations thereof. In some embodiments, M' is selected from a group consisting of Ti, Zr, Nb, Ta, W, Mo, and combinations thereof.

In some embodiments, the lithium metal oxyfluoride is $Li_{1.2}Mn_{0.8-x}Nb_xO_{2-y}F_y$, with $0\leq x\leq0.1$ and $0.2<y\leq0.4$. In some embodiments, the lithium metal oxyfluoride is selected from a group consisting of $Li_{1.2}Mn_{0.625}Nb_{0.175}O_{1.95}F_{0.05}$ (F2.5), $Li_{1.2}Mn_{0.65}Nb_{0.15}O_{1.9}F_{0.1}$ (F5), $Li_{1.2}Mn_{0.675}Nb_{0.125}O_{1.85}F_{0.15}$ (F7.5), $Li_{1.2}Mn_{0.7}Nb_{0.1}O_{1.8}F_{0.2}$ (F10), $Li_{1.2}Mn_{0.725}Nb_{0.075}O_{1.75}F_{0.25}$ (F12.5), $Li_{1.2}Mn_{0.75}Nb_{0.05}O_{1.7}F_{0.3}$ (F15), and $Li_{1.2}Mn_{0.8}O_{1.6}F_{0.4}$ (F20). In some embodiments, the lithium metal oxyfluoride is $Li_{1.2}Mn_{0.7}Nb_{0.1}O_{1.8}F_{0.2}$ (F10).

In some embodiments, the lithium metal oxyfluoride is $Li_{1-30\ x}Mn_aTi_bO_{2-y}F_y$, with $0\leq x\leq0.4$, $0.6<a\leq0.9$, $0<b\leq0.20$, and $0<y\leq0.2$. In some embodiments, the lithium metal oxyfluoride is $Li_{1.3}Mn_{0.7}Ti_{0.1}O_{1.8}F_{0.2}$ or $Li_{1.1}Mn_{0.8}Ti_{0.1}O_{1.9}F_{0.1}$.

Starting at block 605 of the method 600 shown in FIG. 6, at least one lithium-based precursor is provided. In some embodiments, the lithium-based precursor is selected from a group consisting of $Li_2CO_3$, LiOH, $Li_2O$, $Li_2SO_4$, LiCl, $LiNO_3$, and combinations thereof.

At block 610, at least one redox-active transition metal-based precursor is provided. In some embodiments, the at least one redox-active transition metal-based precursor is selected from a group consisting of NiO, $Ni_2O_3$, MnO, $Mn_2O_3$, FeO, $Fe_2O_3$, $Co_2O_3$, $V_2O_3$, $VO_2$, $Cr_2O_3$, $Mo_2O_3$, $W_2O_3$, and combinations thereof.

At block 615, at least one redox-inactive transition metal-based precursor is provided. In some embodiments, the at least one redox-inactive transition metal-based precursor comprises $TiO_2$, $ZrO_2$, $Nb_2O_5$, $Ta_2O_5$, $WO_3$, $MoO_3$, and combinations thereof.

At block 620, at least one fluorine-based precursor comprising a fluoropolymer is provided. In some embodiments, the fluoropolymer is selected from a group consisting of polytetrafluoroethylene (PTFE), fluorinated ethylene propylene (FEP), perfluoroalkoxy (PFA), polyvinyl fluoride (PVF), polyvinylidene fluoride (PVDF), ethylene-tetrafluoroethylene copolymer (ETFE), perfluoropolyether (PFPE) tetrafluoroethylene propylene (FEPM), ethylene tetrafluoroethylene (ETFE), polychlorotrifluoroethylene (PCTFE), and polyethylenechlorotrifluoroethylene (ECTFE). In some embodiments, the fluorine-based precursor is a combination of two or more fluoropolymers. In some embodiments, the fluoropolymer is polytetrafluoroethylene (PTFE). In some embodiments, the only fluorine-based precursor provided is a fluoropolymer. In some embodiments, the provided fluorine-based precursor is not an ionic compound. In some embodiments, the provided fluorine-based precursor is not LiF or does not include LiF.

At block 625, the at least one lithium-based precursor, the at least one redox-active transition metal-based precursor, the at least one redox-inactive transition metal-based precursor, and the at least one fluorine-based precursor comprising a fluoropolymer are mixed to form a mixture. In some embodiments, the mixing comprises ball milling.

In some embodiments, stoichiometric amounts of the at least one lithium-based precursor, the at least one redox-active transition metal-based precursor, the at least redox-inactive transition metal-based precursor, and the at least one fluorine-based precursor comprising a fluoropolymer are mixed. In some embodiments, the lithium-based precursor is added in up to 15% or up to 10% excess of a specified lithium composition.

In some embodiments, at block 630, the mixture is annealed. In some embodiments, the mixture is annealed at about 700° C. to 1200° C., or about 750° C. to 1200° C., for about 5 hours to 18 hours. In some embodiments, the mixture is annealed at about 1000° C. for about 12 hours. In some embodiments, the mixture is annealed under an inert atmosphere. In some embodiments, the inert atmosphere comprises flowing argon. In some embodiments, block 630 is performed after performing block 625.

When using a fluoropolymer for the fluorination of lithium-containing oxides, including lithium-rich cation-disordered rocksalt oxides (DRX), one common issue is the segregation of the LiF phase during synthesis. In some embodiments, to reduce or minimize the formation of LiF, the temperature in the annealing operation can be adjusted. Lower temperatures can promote LiF formation. In some embodiments, excess amounts of the lithium-based precursor are used in the fabrication process. In some embodiments, the lithium-based precursor is added in up to 15% excess of a specified lithium composition. The excess lithium can promote the lithiation of lithium-rich cation-disordered rocksalt oxides (DRX).

In some embodiments, the lithium metal oxyfluoride includes about 0.1 weight % to 5 weight % carbon. In some embodiments, the carbon results from the fluoropolymer decomposition during the process.

Embodiments of the method 600 can be used to manufacture any of the lithium metal oxyfluorides described herein. In some embodiments, a lithium metal oxyfluoride has a general formula $Li_{1+x}(MM')_{1-x}O_{2-y}F_y$, with $0<y\leq0.67$ and $0.09\leq x\leq0.35$. In some embodiments, the lithium metal oxyfluoride has a general formula $Li_{1+x}(MM')_zO_{2-y}F_y$, with $0.6 \leq z \leq 0.95$, $0 < y \leq 0.67$, and $0.05 \leq x \leq 0.4$. The lithium metal oxyfluoride has a cation-disordered rocksalt structure. In some embodiments, $0.2 < y \leq 0.67$. In some embodiments, $0.25 < y \leq 0.67$. In some embodiments, $0.3 < y \leq 0.67$. In some embodiments, $0.35 < y \leq 0.67$. In some embodiments, $0.4 < y \leq 0.67$. In some embodiments, $0.2 < y \leq 0.4$.

Further, any of the lithium metal oxyfluorides described herein can be incorporated in a lithium-ion battery. In some embodiments, a lithium metal oxyfluoride having a general formula $Li_{1+x}(MM')_{1-x}O_{2-y}F_y$, with $0 < y \leq 0.67$ and $0.09 \leq x \leq 0.35$, is incorporated into a positive electrode. In some embodiments, a lithium metal oxyfluoride having a general formula $Li_{1+x}(MM')_zO_{2-y}F_y$, with $0.6 \leq z \leq 0.95$, $0 < y \leq 0.67$, and $0.05 \leq x \leq 0.4$, is incorporated into a positive electrode. The lithium metal oxyfluoride has a cation-disordered rocksalt structure. In some embodiments, the positive electrode is included in a lithium-ion battery. The lithium ion battery can include a negative electrode material and an electrolyte.

The following examples are intended to be examples of the embodiments disclosed herein, and are not intended to be limiting.

EXAMPLE

As described below, we explored the possibility of using an alternative F source for DRX fluorination based on the LMNO model system. A fluorinated polymeric precursor, poly(tetrafluoroethylene) (PTFE) with a chemical formula of $(CF_2-CF_2)_n$, was selected as a F precursor during the solid-state synthesis. A series of F-DRX with the chemical formula of $Li_{1.2}Mn_{0.6+0.5x}Nb_{0.2-0.5x}O_{2-x}F_x$ (LMNOF, $0 < x \leq 0.4$) were synthesized. For the first time, we show that higher F solubility, at least 10 at. %, can be achieved in $Nb^{5+}$-containing and $Mn^{3+}$-redox active DRX, exceeding the observed F solubility limit when LiF was used as F precursor. The addition of the small amount of carbon upon PTFE decomposition boosts DRX conductivity and further improves electrochemical performance. We compared the crystallinity, chemistry, and electronic structures of the LMNOF series by using X-ray diffraction (XRD), hard and soft X-ray absorption spectroscopy (hXAS and sXAS), inductively coupled plasma (ICP) spectroscopy, and F ion selective electrode (F-ISE) analysis. The homogeneity of the samples and elemental distribution at the particle-level were evaluated by using scanning electron microscopy (SEM) and energy-dispersive X-ray (EDX) mapping. The reversibility of cationic and anionic redox behavior as a function of fluorination degree in the F-DRX materials is also discussed.

EXAMPLE—Synthesis and Characterization of LMNOF

To synthesize the F-DRX materials, stoichiometric amounts of $Li_2CO_3$, $Mn_2O_3$, $Nb_2O_5$, poly(tetrafluoroethylene), and ethanol were mixed in a planetary ball mill at the speed of 200 rpm for 18 hr. For $Li_{1.2}Mn_{0.6}Nb_{0.2}O_2$, the same precursors were used except PTFE. Typically, 10 mol. % extra $Li_2CO_3$ was used to compensate possible Li loss during calcination. After drying the mixture for 12 hours, the collected powder was gently ground in a mortar and pestle and annealed at 1,000° C. for 12 hours under the flow of Argon gas. The ramp rates for both heating and cooling were 5° C./min. The as-synthesized powder was further ground in an Argon filled glove box before storage. The synthesis of F2.5 using LiF followed the same procedure except LiF was used instead of PTFE.

In solid-state synthesis reactions, careful control of annealing temperature is important in producing phase-pure crystalline DRX materials. The synthesis of LMNO based DRX often requires a high annealing temperature of more than 950° C. Here, the temperature that allows for simultaneously degradation of PTFE and the formation of the phase-pure cation-disordering structure was investigated. A series of DRX materials with varying level of F content, including $Li_{1.2}Mn_{0.6}Nb_{0.2}O_2$ (F0), $Li_{1.2}Mn_{0.625}Nb_{0.175}O_{1.95}F_{0.05}$ (F2.5), $Li_{1.2}Mn_{0.65}Nb_{0.15}O_{1.9}F_{0.1}$ (F5), $Li_{1.2}Mn_{0.7}Nb_{0.1}O_{1.8}F_{0.2}$ (F10), $Li_{1.2}Mn_{0.725}Nb_{0.075}O_{1.75}F_{0.25}$ (F12.5), $Li_{1.2}Mn_{0.75}Nb_{0.05}O_{1.7}F_{0.3}$ (F15) and $Li_{1.2}Mn_{0.80}O_{1.6}F_{0.4}$ (F20) that correspond to an F content of 0, 2.5, 5, 10, 12.5, 15 and 20 at. %, respectively, were prepared after experimenting with synthesis temperatures. For example, impurity phases were found during the synthesis of F2.5 at an annealing temperature of either 750° C. or 950° C., although crystalline PTFE and LiF were not detected in both cases. Phase-pure F2.5 were obtained when the synthesis temperature was increased to 1,000° C.

FIG. 1 shows the powder XRD patterns collected on pristine F0, F2.5, F5 and F10. All patterns were indexed to the cubic rocksalt crystal structure with a $Fm\bar{3}m$ space group, with no impurities detected. The combined results confirm a continuous decrease in lattice parameter with the increase in F content, ranging from 4.1866 Å for F0, 4.1863 Å for F2.5, 4.1794 Å for F5, and 4.1773 Å for F10, respectively. Further increase in F content to 12.5 at. % leads to the formation of a small amount of impurity phases, including LiF. This suggests that F solubility between 10-12.5 at. % can be achieved when PTFE is used as the F precursor, largely exceeding what was observed when LiF was used as F precursor. In the latter case, the formation of LiF secondary phase was significant beyond the 7.5 at. % limit. The presence of impurity phases increases with further increases in F content to beyond 12.5 at. %, with the cubic rocksalt structure no longer obtained on the F20 sample with 20 at. % of F. This is likely a result of low Nb content in the compounds, as it is known that $d^0$ TM ($Nb^{5+}$ in this case) plays a critical role in the formation of cation-disordered rocksalt crystal structure. The increase of F solubility with PTFE is likely a result of changes in competing phases present during the synthesis.

Thermodynamically, precursors with higher F chemical potential are less stable and therefore provide a larger driving force for high F solubility in DRX. LiF is one of the most stable F containing phases and has a melting point of 848.2° C. PTFE melts at a much lower temperature of 327° C. and decomposes before 500° C. This renders PTFE a better fluorination precursor than LiF.

The particle morphology and elemental distribution of the as-prepared F-DRX samples were further examined by using SEM and EDX mapping, respectively. The average primary particle size of F0 was ~10 μm, with the majority of the particles adopting irregular shapes. Fluorine substitution generally increases the particle size. The average particle size of F2.5 increased to ~20-30 μm. As the F content increases, the particle size further increases, with the average size reaching ~30-50 μm for F5 and F10, respectively. Uniform elemental distribution of Mn, Nb, O, and F at both bulk- and particle-levels was observed on all samples. The ratio between Mn and Nb is consistent with the theoretical values as well as those determined by ICP measurements.

Accurately quantifying the F content in the F-DRX is challenging, as most analytical techniques cannot differentiate the presence of F in the rocksalt lattice vs. impurities such as LiF. Solid-state NMR is one of those few exceptions where a combination of $^7$Li and $^{19}$F NMR analysis can distinguish the incorporation of bulk F in the DRX structure from F-containing diamagnetic impurities or domains. However, due to the broad nature of the chemical shift distribution, quantification of F content within the F-DRX series remains difficult. Here an alternative method of using fluoride ion selective electrode was adopted to determine the F content in the series. Although the technique measures the total amount of F present in the bulk sample, in the absence of impurities, the level of F substitution in DRX can be determined. The measured F contents were consistent with the targeted value in each sample, confirming the high quality of the synthesized F-DRX samples.

Figure 2A:
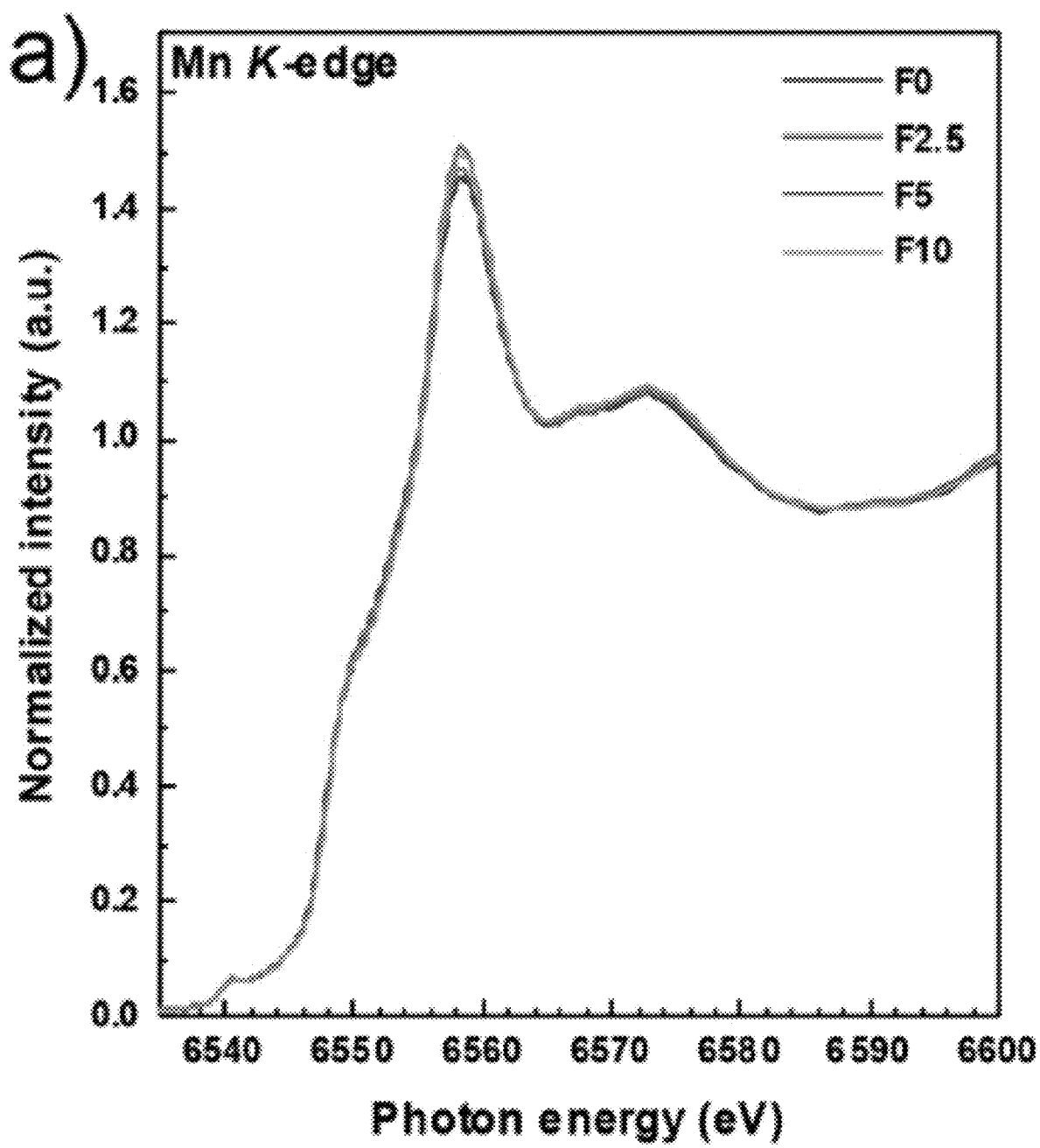
FIGS. 2A-2F show hard and soft XAS profiles of F0, F2.5, F5 and F10.
Figure 2B:
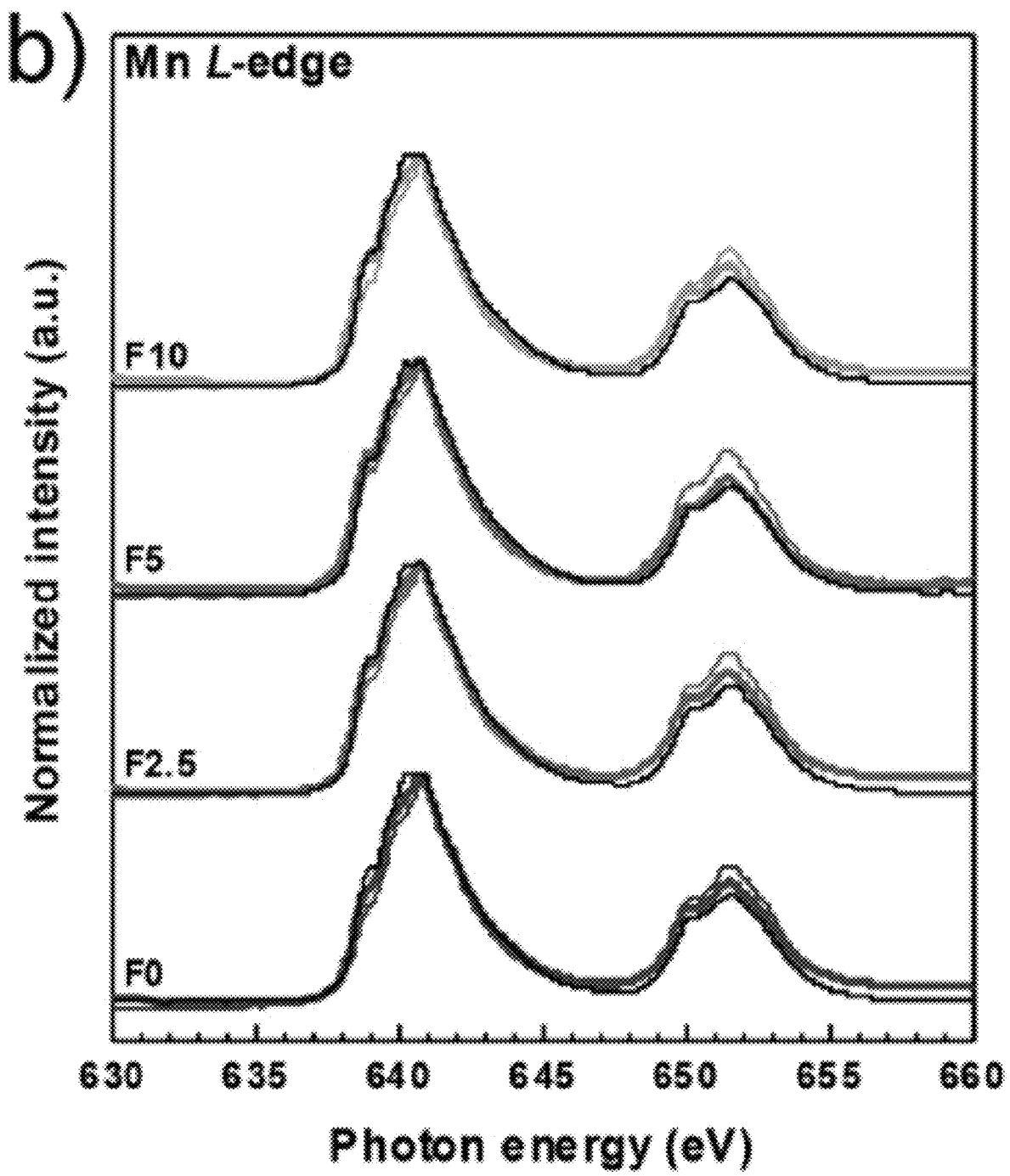

Hard and soft X-ray absorption spectroscopy were used to investigate the bulk and surface chemistry of the samples. FIG. 2A shows the X-ray absorption near-edge structure (XANES) spectroscopy of Mn K-edge collected on the pristine F0, F2.5, F5, and F10. The energy position at the first derivative of the rising-edge is often used to index the oxidation state of TMs. A shift towards higher energy corresponds to an increase in TM oxidation state while lower energy shift indicates TM reduction. The K-edge energy positions for F0, F2.5, F5, and F10 are nearly constant at ~6548 eV, consistent with the energy position of $Mn_2O_3$ (Mn(III)), as shown in the standard spectra of Mn at various oxidation states. This suggests that bulk Mn remains at the trivalent state in all pristine DRX samples. Mn L-edge sXAS spectra were also collected using both total electron yield (TEY) and total fluorescence yield (FY) detectors, and the results on the same set of samples are shown in FIG. 2B. While the TEY profiles (thick line) represent signals from the top surface layer of ~5 nm, the FY signals (thin lines) arise from the deeper subsurface region of ~50 nm. The broad $L_3$-edge absorption near 640.8 eV is a clear indication of Mn(III) features, as both peak position and profile match well with that of $Mn_2O_3$ standard. The observation of $Mn^{3+}$ cations both in the bulk and on the surface in all three F-DRX provides further evidence on the successful incorporation of F into the rocksalt lattice. We note that the decomposition of PTFE also introduces a small amount of carbon, which often reduces $Mn^{3+}$ to $Mn^{2+}$ during the synthesis. Although $Mn^{2+}$ presence was not observed in F2.5, F5, and F10, in the case of F15 and F20 where a higher amount of PTFE was used for synthesis, $Mn^{2+}$ was found by the soft XAS measurements.

Figure 2C:
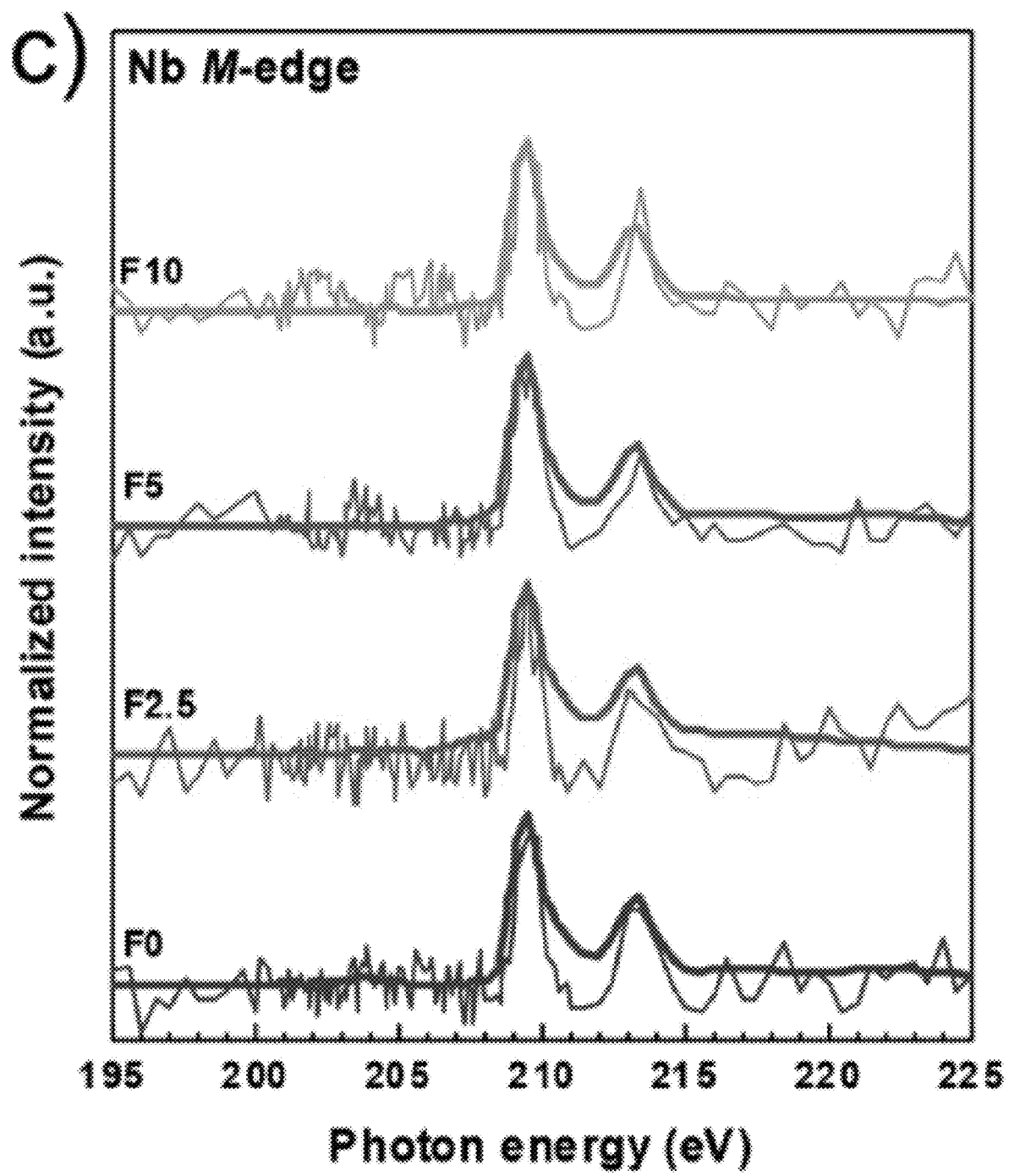
Figure 2D:
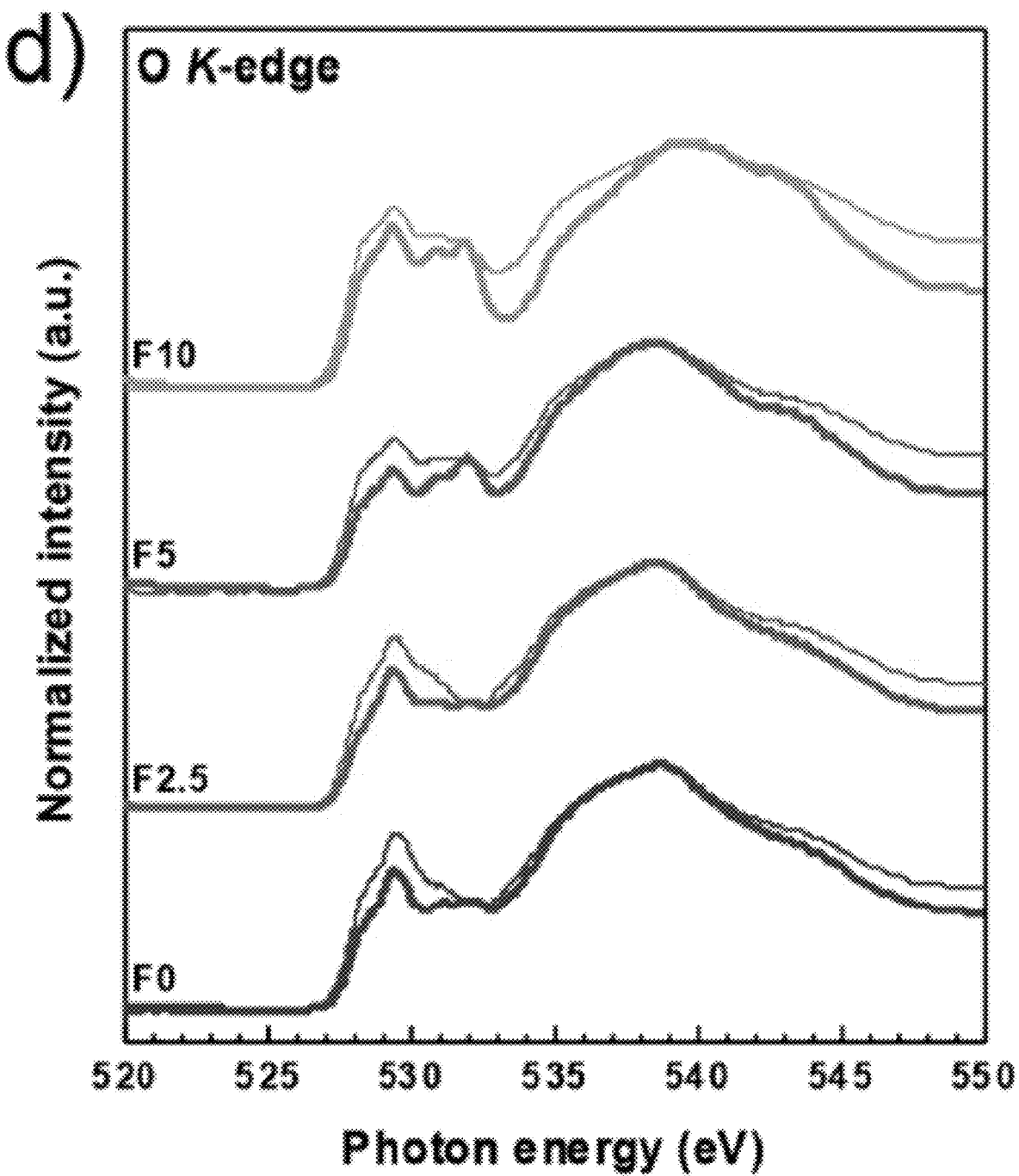
Figure 2E:
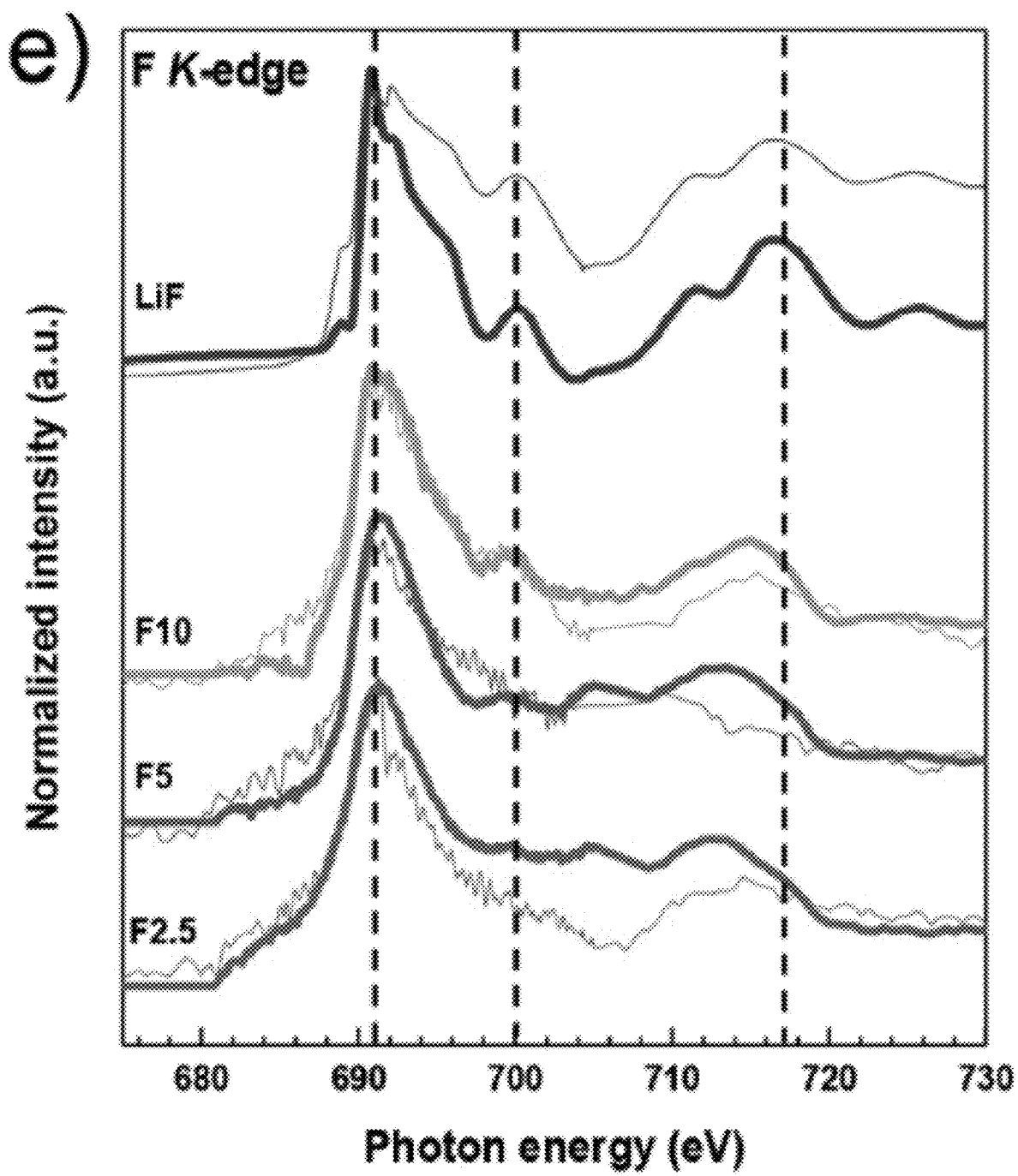
Figure 2F:
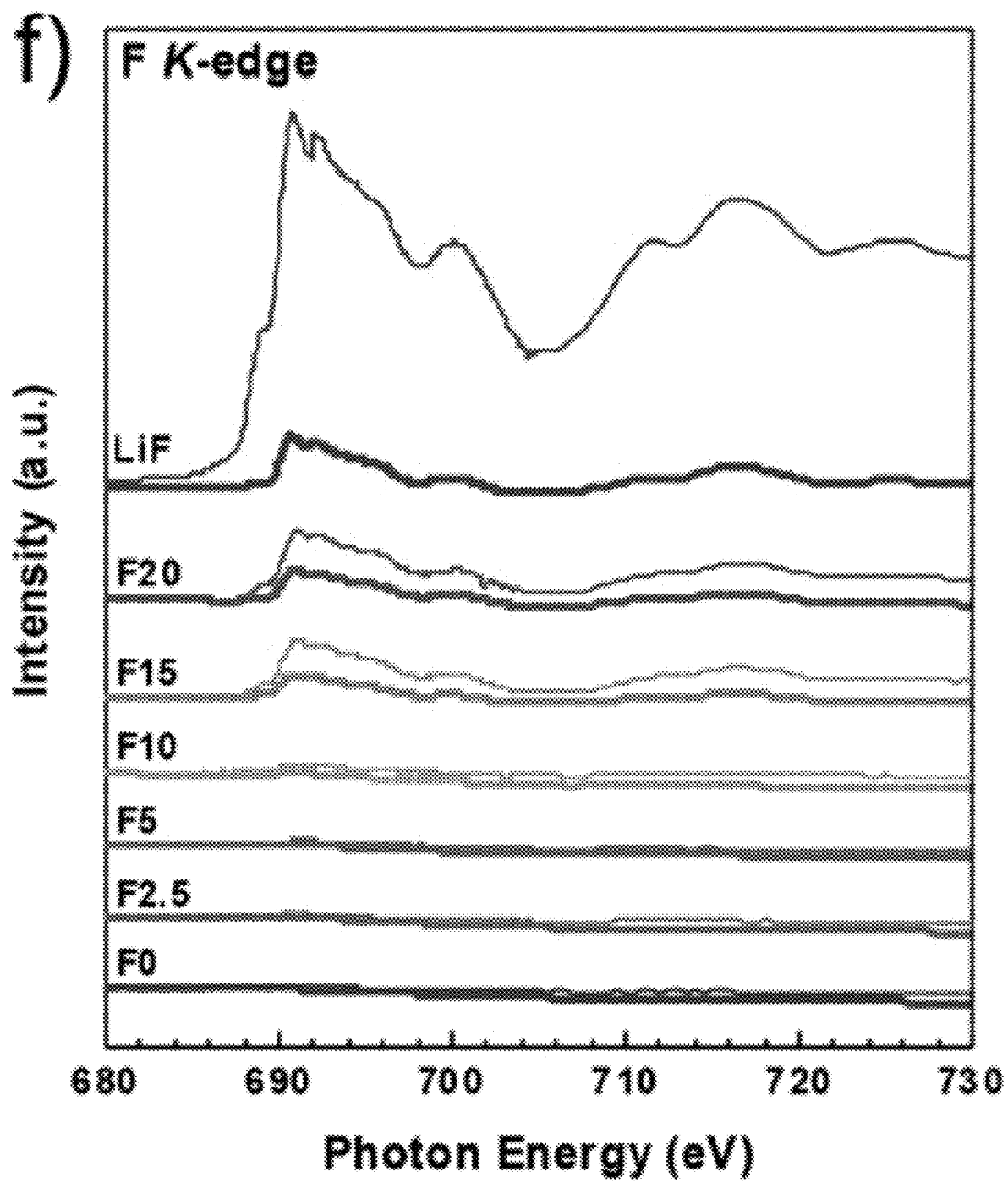

FIGS. 2C and 2D show the normalized sXAS spectra for the Nb $M_{4,5}$-edge and O K-edge, respectively. The presence of $Nb^{5+}$ cation is evidenced by the Nb M-edge peaks through the low energy scan where changes were not observed upon the incorporation of F anions. It is known that the pre-edge peak below 533 eV on the O K-edge spectrum corresponds to the unoccupied 2p states in the hybridization of TM-3d and O-2p. The O pre-edge peaks for F0 and F2.5 are nearly identical, indicating that at low F content, the effect on oxygen electronic structure is minimal. On the other hand, with F content over 5 at. %, the intensity of the shoulder peak at ~533 eV increases significantly, leading to the splitting peak feature centered at about 531 eV. This suggests that the presence of a larger amount of F disrupts O electronic structure in the rocksalt lattice. As the broad band above 533 eV corresponds to the hybridized states of TM-4 sp and O-2p orbitals relating to the metal-ligand bond distance, the shift towards higher energy in F10 signifies the shortening of metal-oxygen bonding distance in the sample. Further investigation on the F K-edge spectra (FIGS. 2E and 2F) confirms the presence of F species in all F-DRX, although it is unclear whether F resides in the rocksalt lattice or appears on an impurity phase, commonly LiF. Upon comparison with the standard spectrum of LiF, which exhibits strong peaks at 691 and 700 eV as well as a broad band between 707 and 730 eV (FIG. 2E), it can be seen that the TEY and FY F signals detected on F2.5, F5, and F10 are different from those of LiF, further confirming the incorporation of F in the DRX lattice both in the subsurface region as well as on the surface. On the other hand, distinct LiF-like features are observed in both TEY and FY spectra collected on F15 and F20 samples with higher F contents (FIG. 2F). We found that the formation of LiF was also promoted by lower synthesis temperature. For example, LiF formation were detected when synthesis of F2.5 was carried out at 750° C., as shown by both TEY and FY modes. The signal, however, disappears upon increasing the annealing temperature to 950° C.

EXAMPLE—Electrochemical Performance of LMNOF Cathodes

To evaluate the electrochemistry, the DRX active materials were first ball-milled with a carbon additive in a weight ratio of 8:2. This effectively breaks down the large DRX particles to a similar average particle size of ~1 μm for all samples. In fabricating the composite cathodes, the prepared mixture was then blended with a carbon additive and a PVDF binder in a weight ratio of 7:2:1. The fraction of the active mass loading in the electrode is therefore 56 wt. %.

Figure 3E:
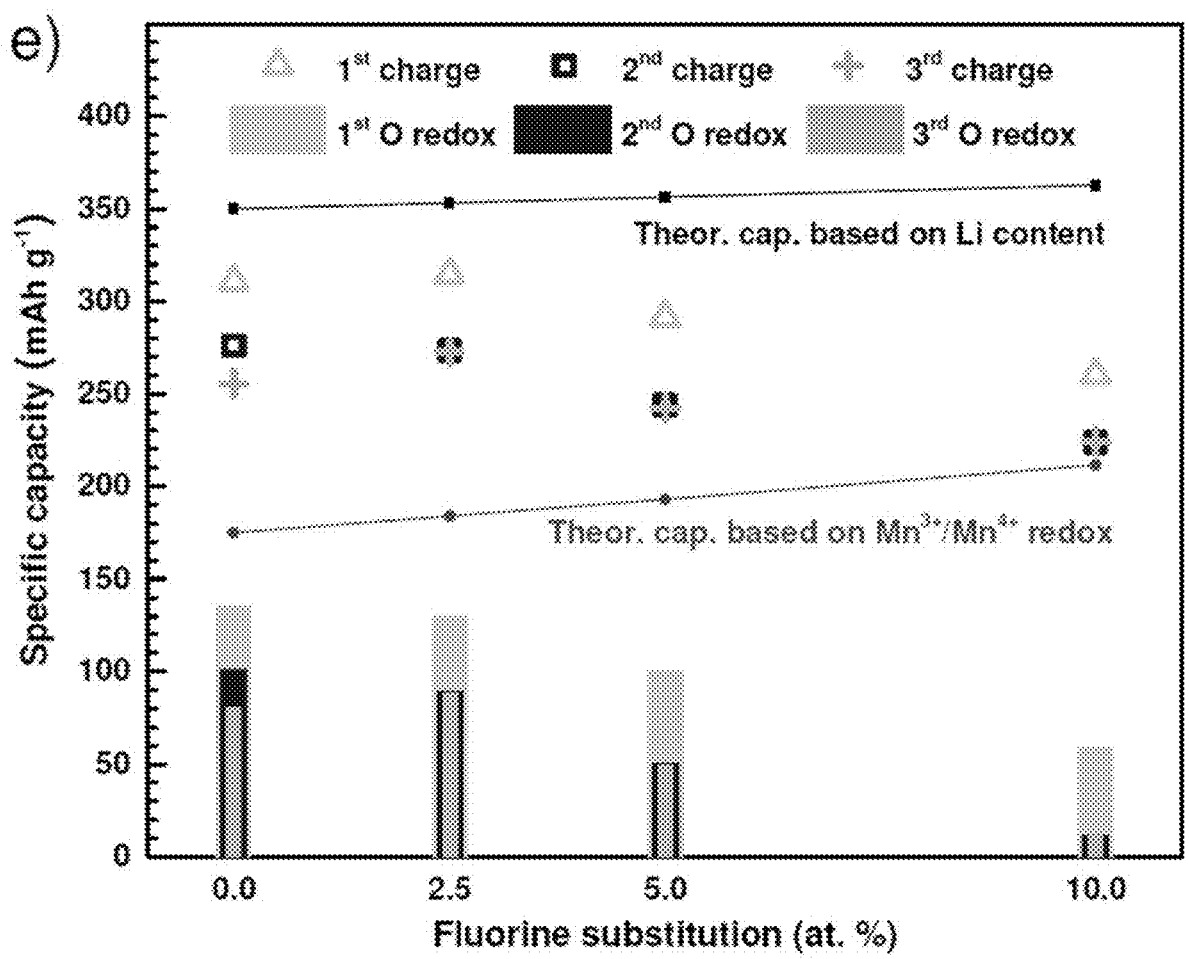

FIGS. 3A-3E compare half-cell electrochemical performance of the non-fluorinated (F0) and fluorinated (F2.5, F5 and F10) DRX cathodes when cycled between 1.5-4.8 V at a current rate of 10 mA/g. The theoretical capacities based on the total Li content (1.2 mole of Li per formula unit) are 350, 353, 356, and 363 mAh/g for F0, F2.5, F5 and F10, respectively, of which 175, 184, 193, and 212 mAh/g comes from the contribution of $Mn^{3+}/Mn^{4+}$ redox couple. As shown in the charge and discharge voltage profiles and the corresponding differential capacity vs. voltage (dQ/dV) plots (FIGS. 3A-3D), the initial charge voltage curve of the non-fluorinated F0 displays a sloping region at low voltages and a distinct "flatter" region at high voltages, indexed as region A and B, respectively (FIG. 3A). In the LMNO system, $Nb^{5+}$ cation is known to remain electrochemically inactive. Using a combination of electrochemical characterization techniques, synchrotron X-ray diffraction, soft and hard X-ray absorption, resonant inelastic X-ray scattering, and differential electrochemical mass spectroscopy, previous studies have primarily attributed region A and B to the cationic Mn redox and anionic O redox, respectively, with the latter involving the oxidation of $O^{2-}$ to $O^{n-}$ (0<n<2) and $O_2$ gas evolution. The two regions are also indexed as A' and B' in the dQ/dV plot (FIG. 3B). Careful comparison shows that O redox activities in the B' region tends to decrease with increasing F content in DRX, with the changes between F5 and F10 particularly significant. In the case of F10, the decrease in the O redox peak is in a remarkable contrast to the sharper and more intense Mn redox peak at region A', confirming increasing fraction of capacity contribution from the Mn cationic redox. The overall capacity of the F-DRX materials decreases with the increase in F substitution, with an initial discharge capacity of ~269, 270, 241, and 207 mAh/g obtained on F0, F2.5, F5, and F10 cathodes, respectively. We note that the first cycle irreversible capacity loss (ICL) increases while the coulombic efficiency decreases with the increase in F content (FIG. 3A). In the second cycle, however, the ICL becomes lower in the F-DRX than that in the non-fluorinated DRX (FIG. 3C). In all samples, the potential for the first redox peak arising from Mn redox (C', FIG. 3D) was lower than that in the first cycle. The O redox active region (D) was significantly reduced than that in the first cycle, which is shown by a lower intensity of the cathodic peak (D') as well. These differences are likely related to the changes in cathode-electrolyte interfacial chemistry between DRX and F-DRX. Detailed studies are currently underway, and the results will be reported in a following publication.

FIG. 3E summarizes the $1^{st}$, $2^{nd}$ and $3^{rd}$ cycle charge capacity contribution as a function of F content. Assuming the contribution from the $Mn^{3+}/Mn^{4+}$ redox couple remain constant in all three cycles, the capacity contribution from the O oxidation varies with F content as well as cycle number. With the increase in F content from 0 to 2.5, 5, and 10 at. %, O redox capacity contribution in the first cycle decreases from ~136 to 130, 100, and 59 mAh/g, respectively. These values correspond to 44%, 42%, 34%, and 22% of the initial charge capacity. The O oxidation capacity contribution in the second cycle becomes much lower, with 101, 89, 51, and 12 mAh/g obtained on F0, F2.5, F5, and F10, respectively, corresponding to 37%, 33%, 21%, and 5% of the charge capacities. While O capacity appears to stabilize after the second cycle in F-DRX, evidenced by the same contribution between the second and third cycle, the value in F0 continues to decrease. After three cycles, the O contribution in F0 was reduced to 31%. The results suggest an overall lower O capacity contribution and more reversible nature of oxygen redox in the F-DRX materials.

FIGS. 4A and 4B compare the cycling stability of the cathodes. While the initial capacity was lower in F-DRX, the capacity retention was much improved. After 30 cycles, the remaining discharge capacities were 226, 247, 226, 254 mAh/g for F0, F2.5, F5, and F10, respectively, corresponding to a capacity retention of 84%, 92%, 94%, and 123%. The unusual increase in capacity along with cycling in F10 is likely a result of changes in Mn redox chemistry or enhanced contribution from O redox. Detailed computational, characterization, and mechanistic studies are currently underway to understand the source of capacity increase.

The average voltage is also an important metrics in characterizing the cycling stability of cathode materials with anionic redox activities. Measurements of the average voltage and the voltage retention during the first 30 cycles of the DRX cathodes were made. While voltage decay was broadly observed, voltage retention was much improved with fluorination. During the first 30 cycles, the average voltage decreased about 300 and 250 mV for F2.5 and F10, respectively, with the latter showing the best performance in the series. The results are consistent with the improved reversibility and stability of O redox in F-DRX.

Measurements of the specific discharge energy and energy retention upon the cycling of the cathodes were also made. The initial energy densities of F0 and F2.5 were over 855 Wh/kg while that of F5 and F10 were about 770 and 640 Wh/kg, respectively. After 30 cycles, the energy densities in F0 and F5 were reduced to lower than 645 Wh/kg while those of F2.5 and F10 were at about 700 and 710 Wh/kg, respectively. This corresponds to about 82% and 84% of energy retention in F2.5 and F5, respectively, while the retention in F0 was 75%. F2.5 synthesized with LiF precursor also showed a similar lower retention of ~76%. On the other hand, the energy retention in F10 improves with cycling, clearly demonstrating superior cathode performance as it reaches about 110% increase after 30 cycles.

We further compared the performance of F-DRX samples made with PTFE and LiF precursors. Due to the limited F solubility previously described, only F2.5 and F5 in the series can be made phase-pure by using LiF as the F precursor. FIGS. 4C and 4D show the electrochemical performance obtained on F2.5 cathode prepared from PTFE and LiF. In the $1^{st}$ cycle charge/discharge voltage profile and the corresponding dQ/dV plot, a slight reduction in polarization was observed in PTFE sample. After 30 cycles, the discharge capacity was 247 and 225 mAh/g for PTFE and LiF samples, respectively, corresponding to capacity retention of 92% and 85%. The same trend was also observed on the specific energy and energy retention. We believe the introduction of a small amount of carbon, resulting from the decomposition of the PTFE polymer, may play a role in the enhanced electrochemical performance. Previous studies have shown that a small amount of well-dispersed carbon additive can significantly improve the electronic conductivity of electrode materials, particularly in poor electronic conductors such as $LiFePO_4$. Assuming no C loss during the heat treatment, the calculated added carbon content is 0.46, 0.92, and 1.88 wt. % for F2.5, F5, and F10, respectively.

Figure 5A:
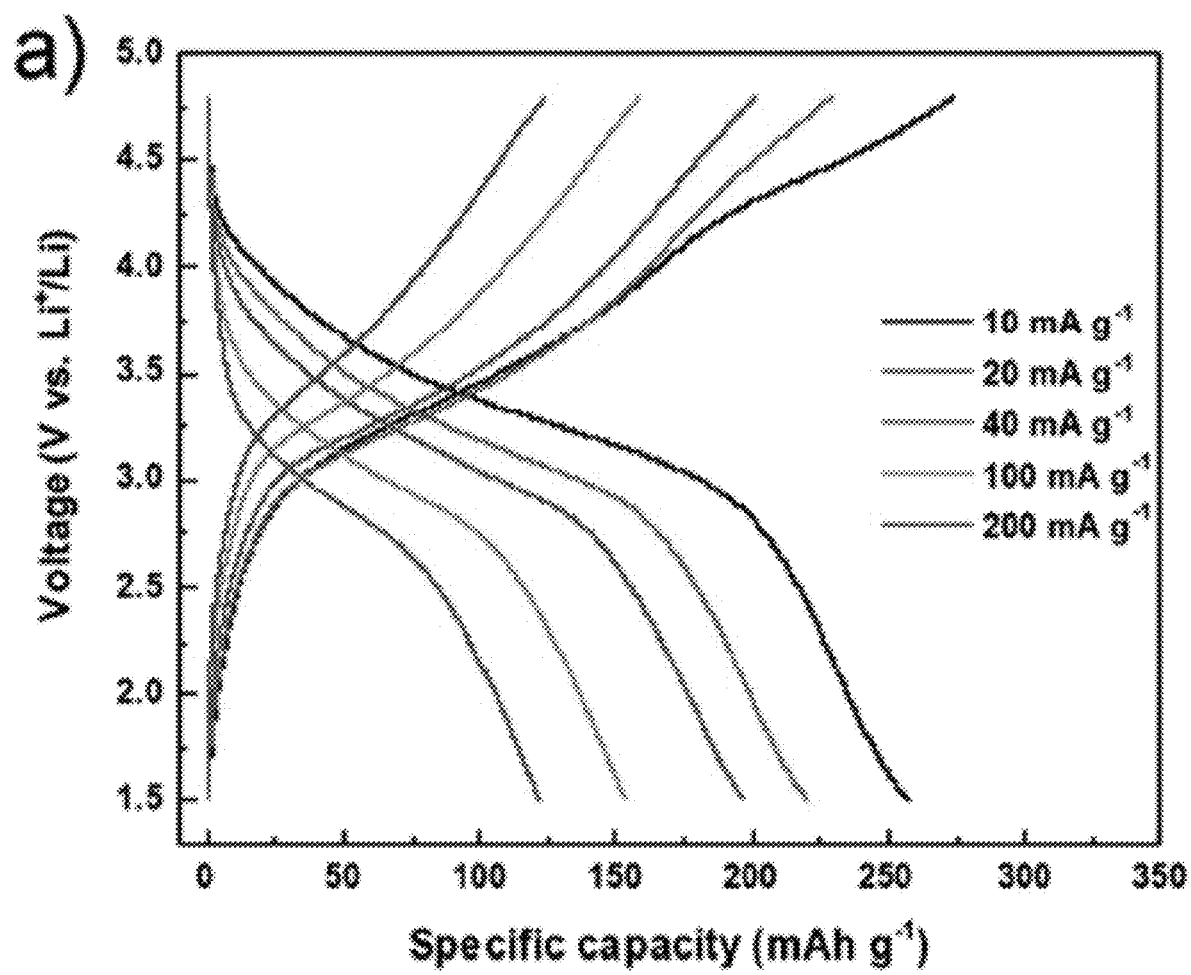
FIGS. 5A-5D show voltage profiles of cathodes at varying current densities.
Figure 5B:
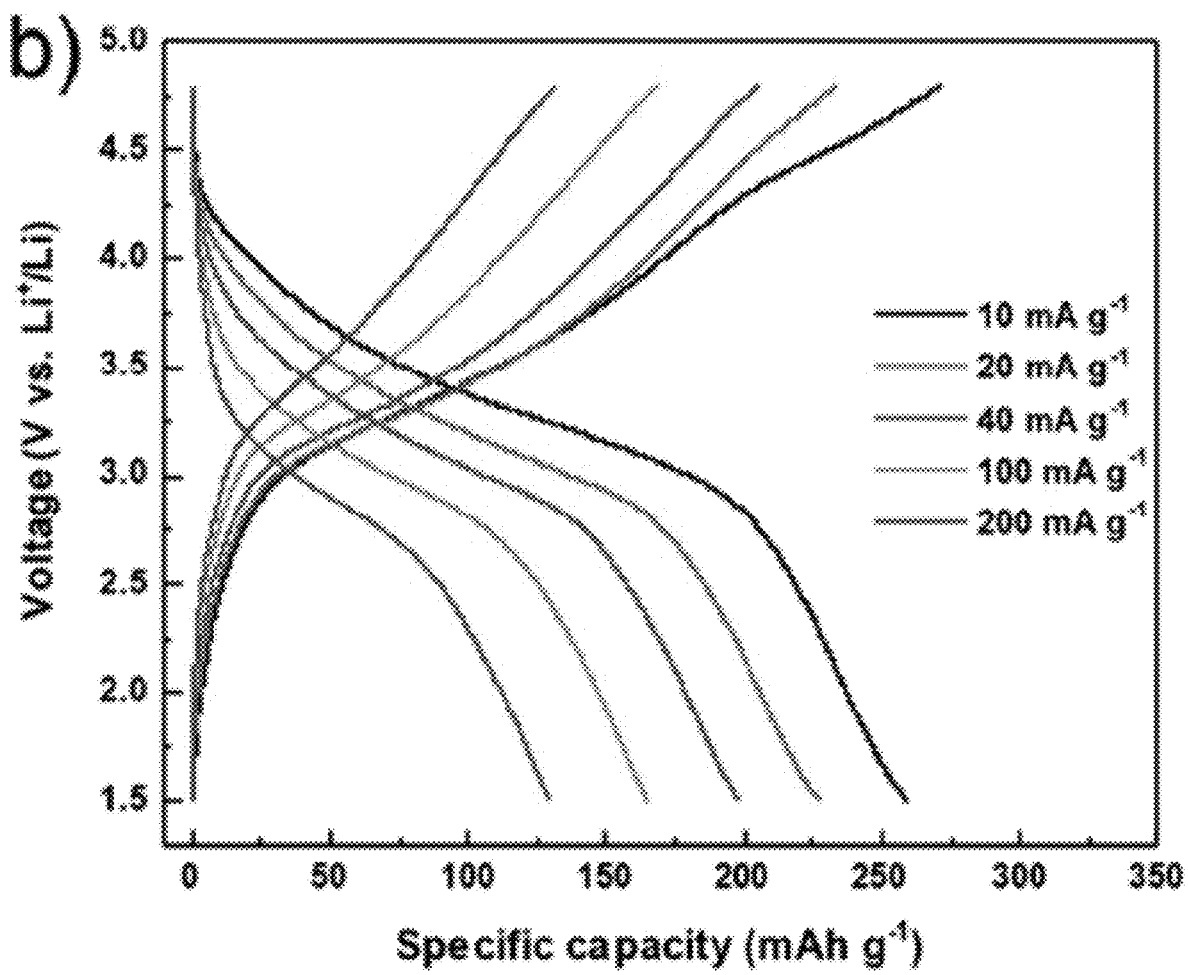
Figure 5C:
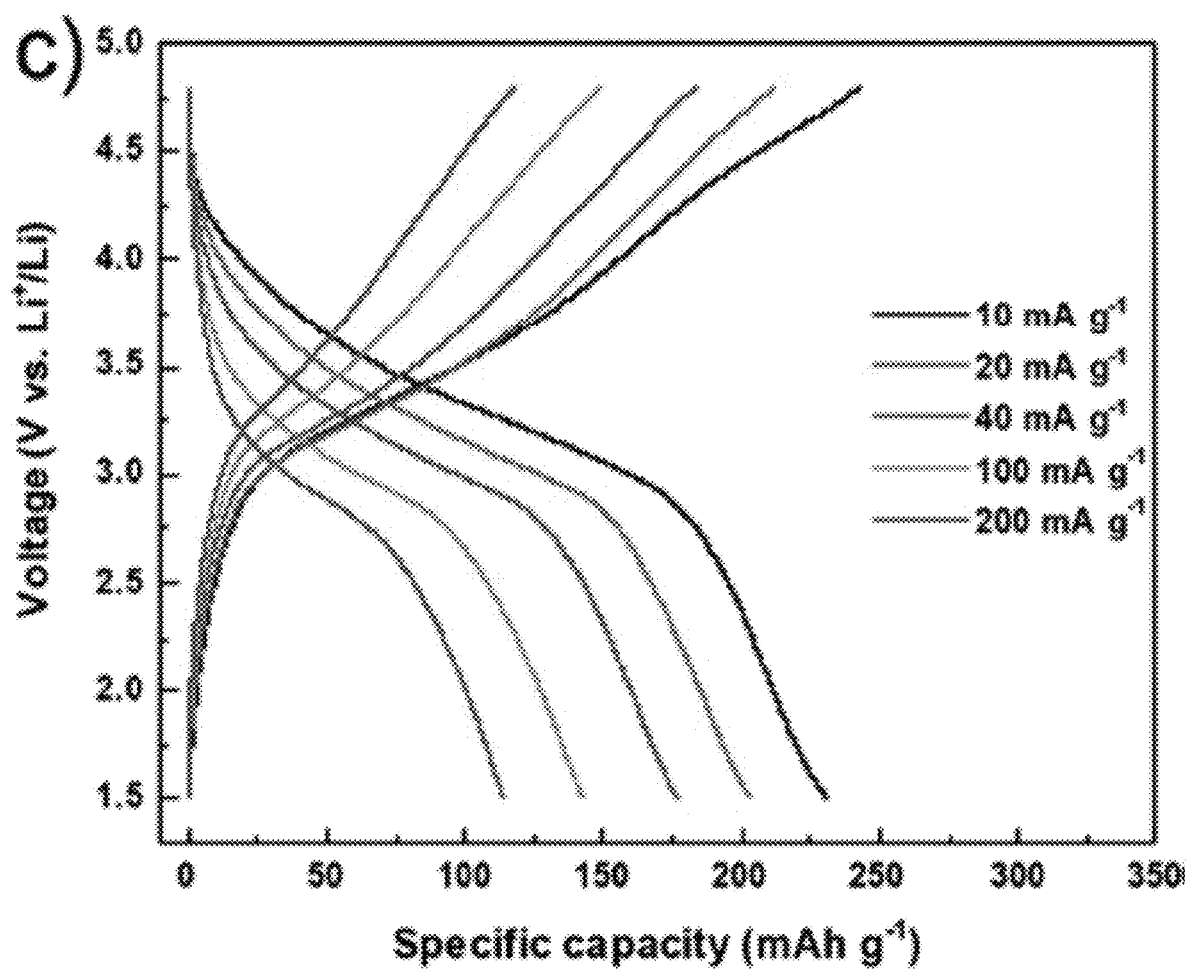
Figure 5D:
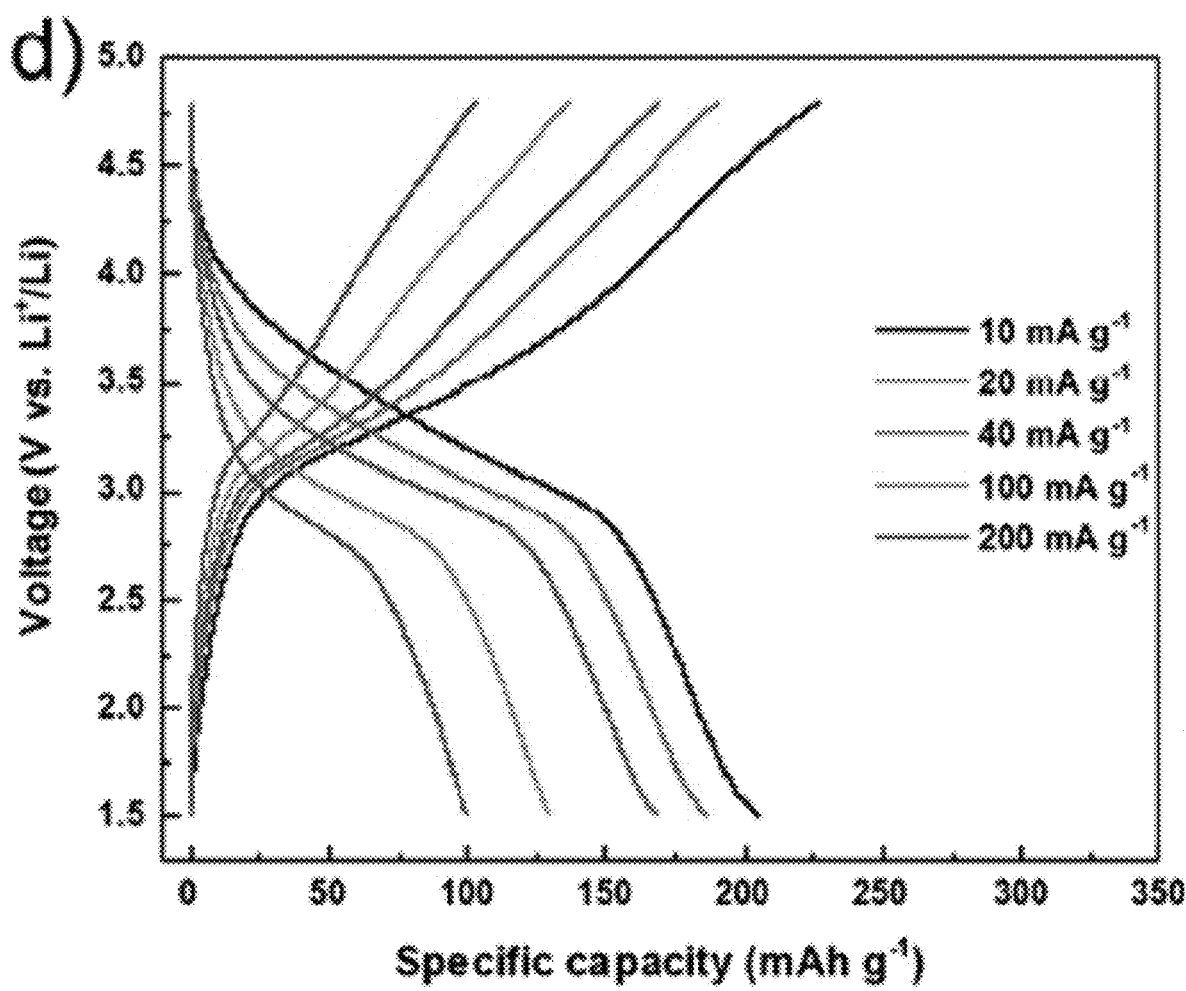
Figure 5E:
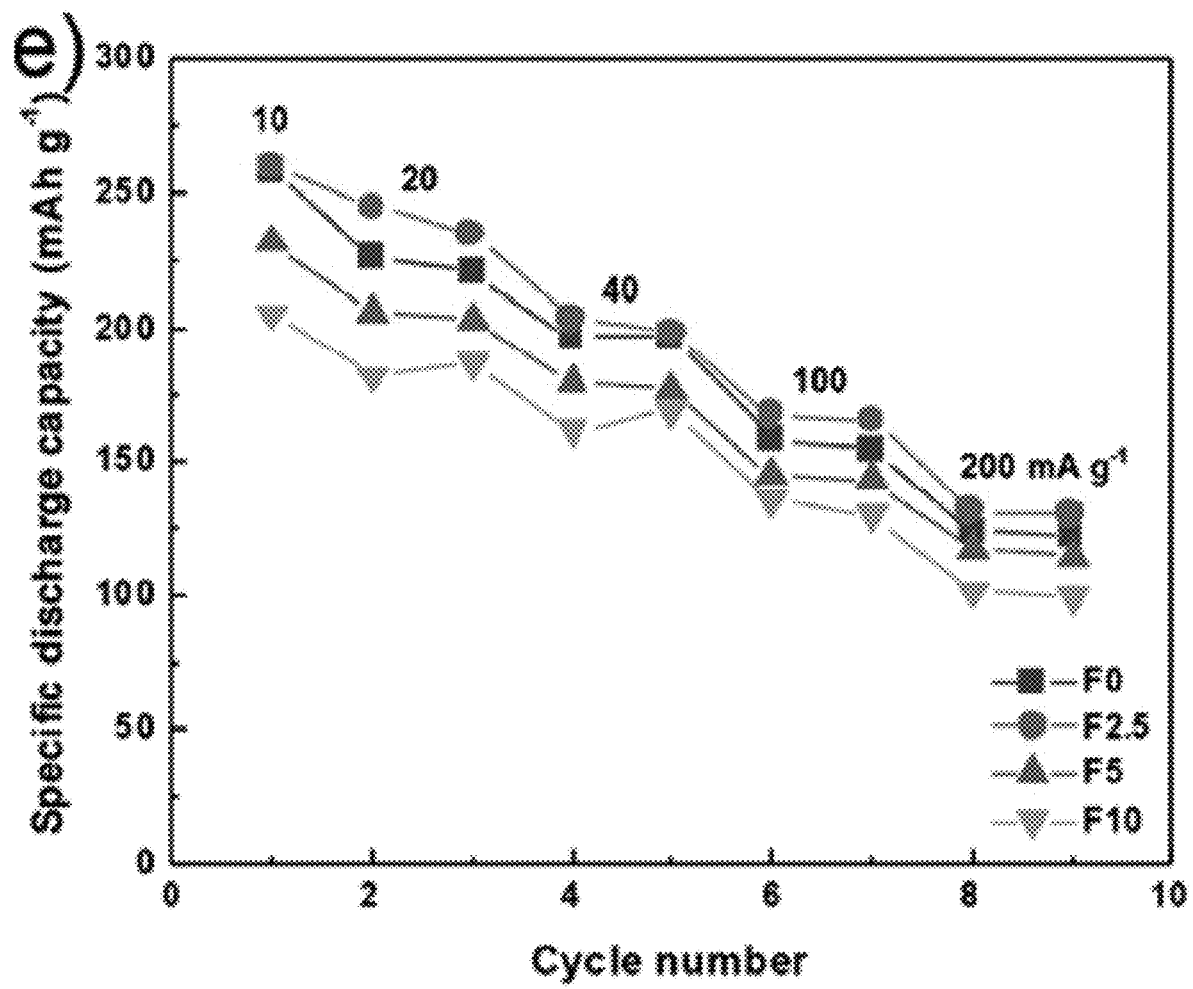
FIG. 5E shows a rate capability comparison of the cathodes.
Figure 5F:
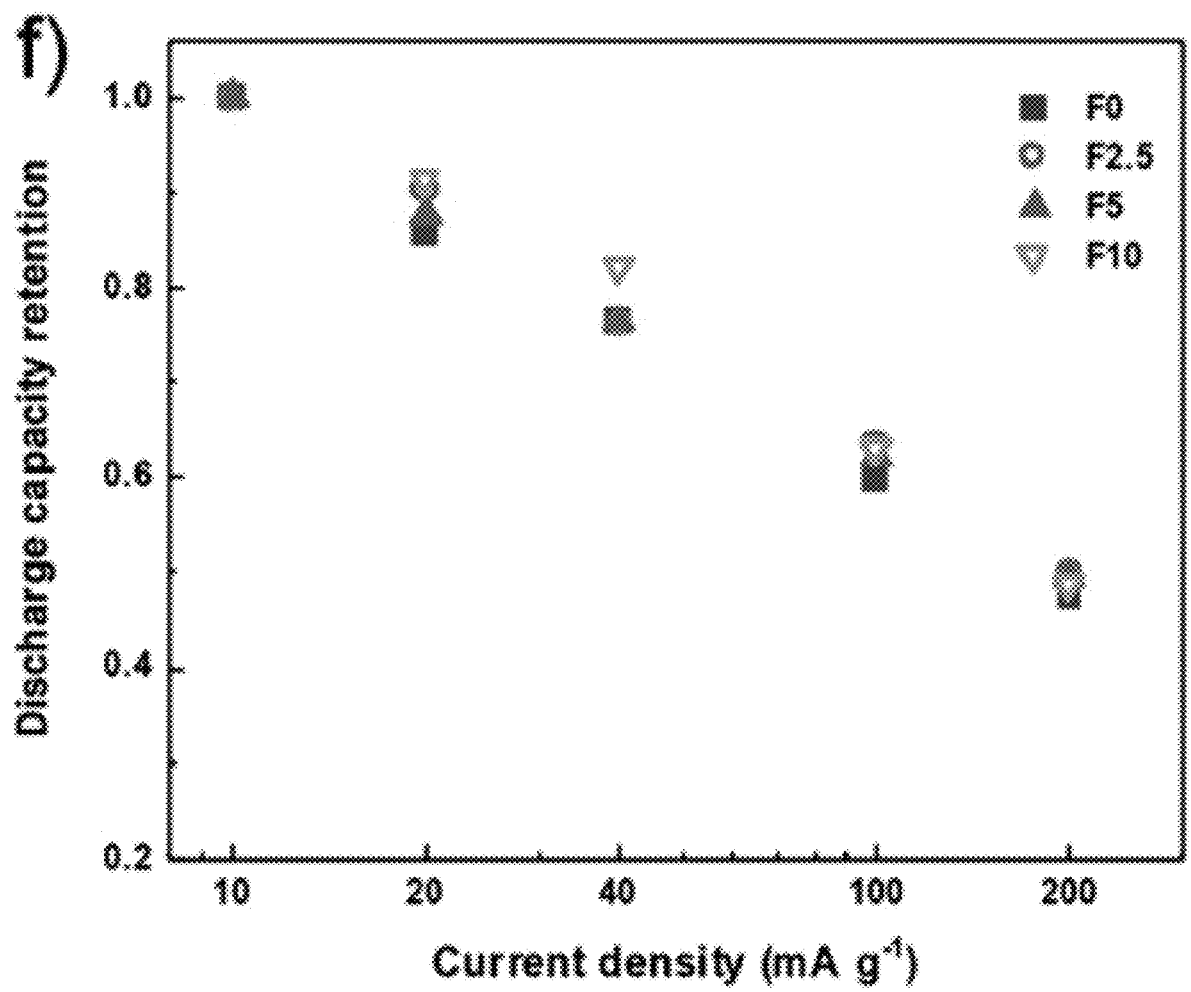
FIG. 5F shows a comparison of the discharge capacity retention as a function of current density.

Kinetic properties were evaluated by carrying out the rate capability analysis in the voltage window of 1.5-4.8 V. While the voltage profiles remained similar (FIGS. 5A-5D, the discharge capacity decreased with the increase of current density in all DRX cathodes. As current densities increased from 10 to 200 mA/g, the discharge capacities decreased from 257, 260, 231, and 205 mAh/g to 122, 130, 114, and 100 mAh/g in F0, F2.5, F5, and F10, respectively (FIGS. 5E and 5F). In general, the rate capability increased with fluorination, likely due to improvements in both ionic and electronic conductivities. A direct correlation to the level of fluorination, however, was not observed.

Conclusion

In summary, a novel synthesis approach was developed to incorporate fluorine anions into the disordered rocksalt crystal structure. By utilizing a fluoropolymer precursor, higher F content of 10-12.5 at. % was made possible in DRX materials. Increasing F content reduces the irreversible oxygen redox activities while increasing the cationic redox contribution to the capacity, leading to an overall more stable cathode material. Although the initial discharge capacity was slightly lower than that in the nonfluorinated DRX, F-DRX shows better electrochemical stability over long term cycling.

Further details regarding the embodiments described herein can be found in Juhyeon Ahn et al., "A Fluorination Method for Improving Cation-Disordered Rocksalt Cathode Performance," Advanced Energy Materials, Volume 10, Issue 35, Sep. 15, 2020, 2001671, which is herein incorporated by reference.

In the foregoing specification, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

What is claimed is:

1. A method for manufacturing lithium metal oxyfluoride having a general formula $Li_{1+x}(MM')_zO_{2-y}F_y$, wherein $0.6 \leq z \leq 0.95$, wherein $0 < y \leq 0.67$, and wherein $0.05 \leq x \leq 0.4$, the lithium metal oxyfluoride having a cation-disordered rocksalt structure, comprising:
   providing at least one lithium-based precursor;
   providing at least one redox-active transition metal-based precursor;
   providing at least one redox-inactive transition metal-based precursor;
   providing at least one fluorine-based precursor comprising a fluoropolymer; and
   mixing the at least one lithium-based precursor, the at least one redox-active transition metal-based precursor, the at least redox-inactive transition metal-based precursor, and the at least one fluorine-based precursor comprising a fluoropolymer to form a mixture.

2. The method of claim 1, wherein the fluoropolymer is selected from a group consisting of polytetrafluoroethylene (PTFE), fluorinated ethylene propylene (FEP), perfluoroalkoxy (PFA), polyvinyl fluoride (PVF), polyvinylidene fluoride (PVDF), ethylene-tetrafluoroethylene copolymer (ETFE), perfluoropolyether (PFPE) tetrafluoroethylene propylene (FEPM), ethylene tetrafluoroethylene (ETFE), polychlorotrifluoroethylene (PCTFE), and polyethylenechlorotrifluoroethylene (ECTFE).

3. The method of claim 1, wherein the fluoropolymer is polytetrafluoroethylene (PTFE).

4. The method of claim 1, wherein M is selected from a group consisting of Ni, Mn, Fe, Co, V, Cr, W, Mo, and combinations thereof.

5. The method of claim 1, wherein M' is selected from a group consisting of Ti, Zr, Nb, Ta, W, Mo, and combinations thereof.

6. The method of claim 1, wherein the at least one redox-active transition metal-based precursor is selected from a group consisting of NiO, $Ni_2O_3$, MnO, $Mn_2O_3$, FeO, $Fe_2O_3$, $Co_2O_3$, $V_2O_3$, $VO_2$, $Cr_2O_3$, $Mo_2O_3$, $W_2O_3$, and combinations thereof, and wherein the at least one redox-inactive transition metal-based precursor is selected from a group consisting of $TiO_2$, $ZrO_2$, $Nb_2O_5$, $Ta_2O_5$, $WO_3$, $MoO_3$, and combinations thereof.

7. The method of claim 1, wherein the at least one lithium-based precursor is selected from a group consisting of $Li_2CO_3$, LiOH, $Li_2O$, $Li_2SO_4$, LiCl, $LiNO_3$, and combinations thereof.

8. The method of claim 1, wherein stoichiometric amounts of the at least one lithium-based precursor, the at least one redox-active transition metal-based precursor, the at least redox-inactive transition metal-based precursor, and the at least one fluorine-based precursor comprising a fluoropolymer are mixed, and wherein the lithium-based precursor is added in up to 15% excess of a specified lithium composition.

9. The method of claim 1, wherein the mixing comprises ball milling.

10. The method of claim 1, further comprising:
    after the mixing, annealing the mixture at about 700° C. to 1200° C. for about 5 hours to 18 hours under an inert atmosphere.

11. The method of claim 1, wherein the lithium metal oxyfluoride includes about 0.1 weight % to 5 weight % carbon.

12. The method of claim 1, wherein the lithium metal oxyfluoride is $Li_{1.2}Mn_{0.8}Nb_xO_{2-y}F_y$, wherein $0 \leq x \leq 0.1$, and wherein $0.2 \leq y \leq 0.4$, or wherein the lithium metal oxyfluoride is $Li_{1+x}Mn_aTi_bO_{2-y}F_y$, wherein $0 \leq x \leq 0.4$, wherein $0.6 < a \leq 0.9$, wherein $0 < b \leq 0.20$, and wherein $0 < y \leq 0.2$.

13. The method of claim 1, wherein the lithium metal oxyfluoride is selected from a group consisting of
$Li_{1.2}Mn_{0.625}Nb_{0.175}O_{1.95}F_{0.05}$ (F2.5),
$Li_{1.2}Mn_{0.65}Nb_{0.15}O_{1.9}F_{0.1}$ (F5),
$Li_{1.2}Mn_{0.675}Nb_{0.125}O_{1.85}F_{0.15}$ (F7.5),
$Li_{1.2}Mn_{0.7}Nb_{0.1}O_{1.8}F_{0.2}$ (F10),
$Li_{1.2}Mn_{0.725}Nb_{0.075}O_{1.75}F_{0.25}$ (F12.5),
$Li_{1.2}Mn_{0.75}Nb_{0.05}O_{1.7}F_{0.3}$ (F15), $Li_{1.2}Mn_{0.8}O_{1.6}F_{0.4}$ (F20),
$Li_{1.3}Mn_{0.7}Ti_{0.1}O_{1.8}F_{0.2}$, and $Li_{1.1}Mn_{0.8}Ti_{0.1}O_{1.9}F_{0.1}$.

* * * * *